(12) United States Patent
Sauer-Budge et al.

(10) Patent No.: US 11,331,659 B2
(45) Date of Patent: May 17, 2022

(54) PIPETTING DEVICES AND METHODS OF USING THE SAME

(71) Applicants: FRAUNHOFER USA, INC., Plymouth, MI (US); THE CHILDREN'S MEDICAL CENTER CORPORATION, Boston, MA (US); BETH ISRAEL DEACONESS MEDICAL CENTER, INC., Boston, MA (US)

(72) Inventors: Alexis Sauer-Budge, Lincoln, MA (US); Holger Wirz, Medford, MA (US); Samuel J. Brookfield, Boston, MA (US); Nira Pollock, Brookline, MA (US); Ronald Janzen, Aachen (DE)

(73) Assignees: FRAUNHOFER USA, INC., Plymouth, MI (US); CHILDREN'S MEDICAL CENTER CORPORATION, Boston, MA (US); BETH ISRAEL DEACONESS MEDICAL CENTER, INC., Boston, MA (US)

( * ) Notice: Subject to any disclaimer, the term of this patent is extended or adjusted under 35 U.S.C. 154(b) by 187 days.

(21) Appl. No.: 16/486,114

(22) PCT Filed: Feb. 14, 2018

(86) PCT No.: PCT/US2018/018259
§ 371 (c)(1),
(2) Date: Aug. 14, 2019

(87) PCT Pub. No.: WO2018/152263
PCT Pub. Date: Aug. 23, 2018

(65) Prior Publication Data
US 2020/0230592 A1   Jul. 23, 2020

Related U.S. Application Data

(60) Provisional application No. 62/459,361, filed on Feb. 15, 2017.

(51) Int. Cl.
*B01L 3/02* (2006.01)
*F04B 13/00* (2006.01)
(Continued)

(52) U.S. Cl.
CPC ............... *B01L 3/0224* (2013.01); *F04B 9/14* (2013.01); *F04B 13/00* (2013.01); *F04B 53/109* (2013.01);
(Continued)

(58) Field of Classification Search
None
See application file for complete search history.

(56) References Cited

U.S. PATENT DOCUMENTS

| | | | |
|---|---|---|---|
| 3,935,734 A * | 2/1976 | Keegan .................. | B01L 3/0231 73/864.17 |
| 4,084,730 A * | 4/1978 | Franke .................... | B01L 3/022 222/309 |

(Continued)

OTHER PUBLICATIONS

International Search Report for International Patent Application No. PCT/US2018/018259, dated Apr. 30, 2018 (2 pages).
(Continued)

*Primary Examiner* — Kathryn Wright
(74) *Attorney, Agent, or Firm* — Nixon Peabody LLP; Ronald I. Eisenstein; David R. Crosby

(57) ABSTRACT

A pipetting device includes a housing, a valve assembly, and an actuator assembly. The housing includes a tip for receiving a capillary tube. The valve assembly includes a shuttle valve having a filling position and a dispensing position and a valve rod. The actuator assembly includes an actuator, a
(Continued)

valve trigger, a piston mount, and an indexing mechanism. The actuator extends from the housing and has a push button coupled to a push rod. The valve trigger being configured to engage the valve assembly and includes an aperture configured to receive the piston mount therein. The indexing mechanism is configured to index a rotated position of the push button to a predefined volume of dispensed fluid.

19 Claims, 21 Drawing Sheets

(51) Int. Cl.
    *F04B 53/10*     (2006.01)
    *F04B 9/14*     (2006.01)
    *G01N 35/10*     (2006.01)

(52) U.S. Cl.
    CPC ... *B01L 2400/0478* (2013.01); *B01L 2400/06* (2013.01); *G01N 35/1016* (2013.01)

(56) References Cited

U.S. PATENT DOCUMENTS

| | | | | |
|---|---|---|---|---|
| 4,099,548 A * | 7/1978 | Sturm | ................ | B01L 3/0234 141/27 |
| 4,369,664 A * | 1/1983 | Bunce | ................ | B01L 3/021 222/207 |
| 5,018,394 A * | 5/1991 | Gilson | ................ | B01L 3/0224 422/925 |
| 5,383,372 A * | 1/1995 | Qureshi | ................ | B01L 3/0231 422/927 |
| 5,747,709 A * | 5/1998 | Oshikubo | ................ | B01L 3/0234 222/287 |
| 5,998,218 A * | 12/1999 | Conley | ................ | B01L 3/0224 422/63 |
| 2013/0078625 A1 * | 3/2013 | Holmes | ................ | B01L 3/0279 435/6.11 |
| 2013/0283884 A1 * | 10/2013 | Beroz | ................ | B01L 3/0275 73/1.74 |

OTHER PUBLICATIONS

Written Opinion of International Searching Authority for International Patent Application No. PCT/US2018/018259, dated Apr. 30, 2018 (5 pages)

Gous, S. et al.; "Feasibility of performing multiple point of care testing for HIV anti-retroviral treatment initiation and monitoring from multiple or single fingersticks"; PLoS One, 2013:8(12):e85265. Epub Jan. 1, 2014 (10 pages).

Scott, L.; "A laboratorian's experience of implementing multiple point-of-care testing in HIV antiretroviral treatment clinics in South Africa"; South African Medical Journal; 2013;103(12):883-4. Epub Feb. 4, 2014 (2 pages).

Daneau, G. et al.; "Human Immunodeficiency Virus (HIV)—Infected Patients Accept Finger Stick Blood Collection for Point-Of-Care CD4 Testing"; PloS One 2016; 11(8):e0161891. Epub Aug. 25, 2016.

Lee, S.R. et al.; "Evaluation of a new, rapid test for detecting HCV infection, suitable for use with blood or oral fluid"; Journal of Virological Methods, 2011; 172(1-2):27-31. Epub Dec. 25, 2010 (5 pages).

Tucker, J.D. et al.; "Accelerating worldwide syphilis screening through rapid testing: a systematic review"; The Lancet infectious diseases. 2010; 10(6):381-6. Epub Jun. 1, 2010 (6 pages).

Ferguson, I. et al.; "Diagnostic accuracy of fingerstick beta-hydroxybutyrate for ketonuria in pregnant women with nausea and vomiting": Academic Emergency Medicine: The Official Journal of the Society for Academic Emergency Medicine. 2013;20(9):954-6. Epub Sep. 17, 2013 (4 pages).

Pollock, N.R. et al.; "Field evaluation of a prototype paper-based point-of-care fingerstick transaminase test"; PloS One. 2013; 8(9):e75616. Epub Oct. 8, 2013 (10 pages).

Glencross, D.K. et al.; "Performance evaluation of the Pima point-of-care CD4 analyser using capillary blood sampling in field tests in South Africa"; Journal of the International AIDS Society. 2012; 15(1):3. Epub Jan. 31, 2012 (13 pages).

Surgilance Safety Lancet Product Information. Retneved from https://medipurpose.com/surgilance/surgilance-classic/ (1 page).

Sarstedt Safety Lancet Product Information. Retrieved from http://www.mediline.si/media/sarstedt-safetylancet.pdf (2 pages).

Maiers, T.J. et al.; "An investigation of fingerstick blood collection for point-of-care HIV-1 viral load monitoring in South Africa"; South African Medical Journal; 2015; 105(3):228-31. Epub Aug. 22, 2015 (4 pages).

Donnell-Fink, L.A. et al.; "Acceptability of fingerstick versus oral fluid rapid HIV testing: results from the universal screening for HIV infection in the emergency room (USHER Phase II) randomized controlled trial"; J. Acquir. Immune. Defic. Syndr. 2009; 61(5):588-92. Epub Nov. 28, 2012 (10 pages).

White, D.A. et al.; "A comparison of patient acceptance of ngerstick whole blood and oral fluid rapid HIV screening in an emergency department": J. Acquir. Immune. Defic. Syndr. 2009; 52(1):75-8. Epub Jul. 11, 2009 (4 pages).

Palombi, L.C. et al.; "Point-ofcare screenings at the University of Minnesota: mechanism for civic engagement": Journal of the American Pharmacists Association (JAPhA); 2014; 54(1):56-62. Epub Jan. 11, 2014 (7 pages).

* cited by examiner

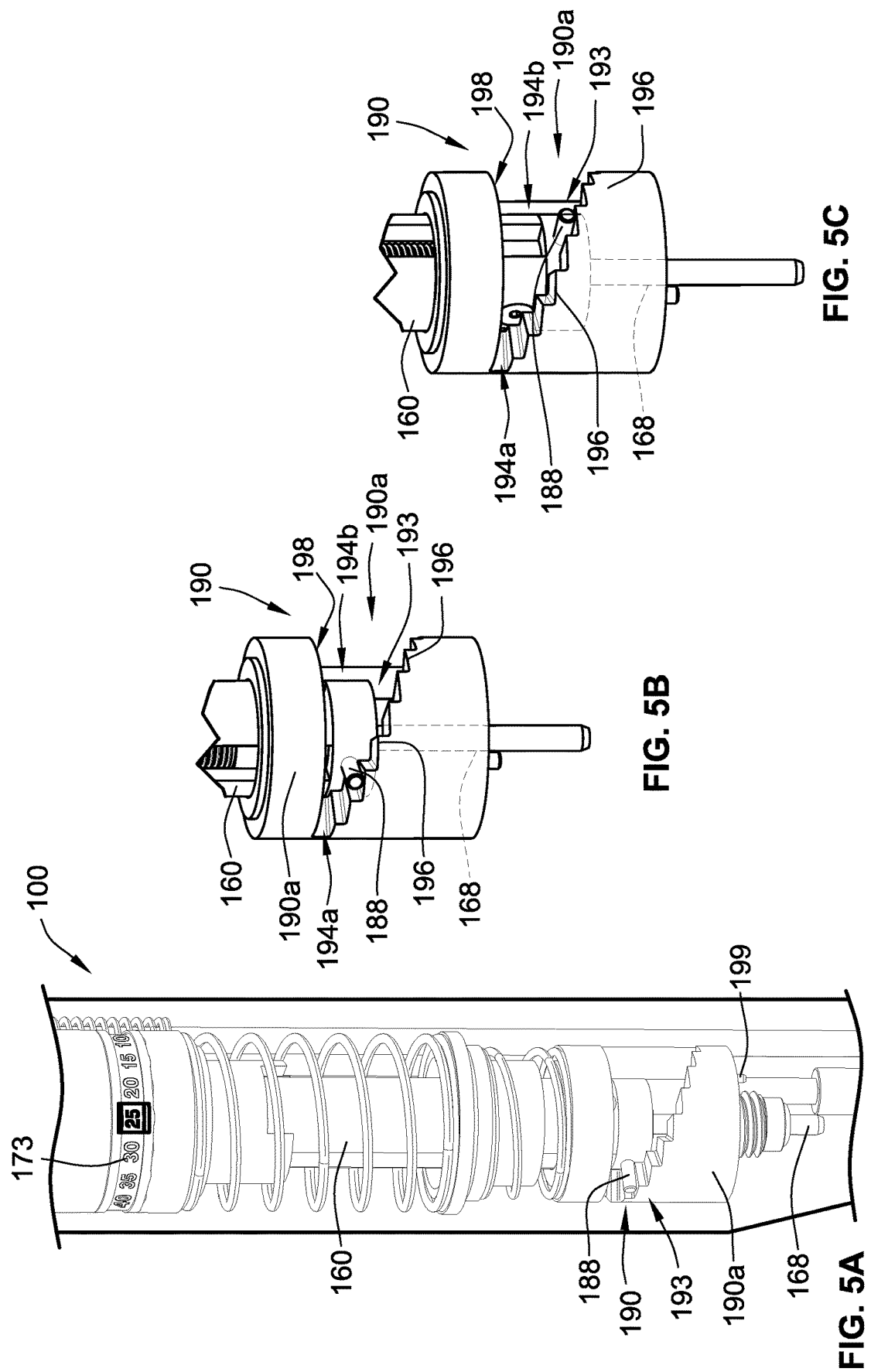

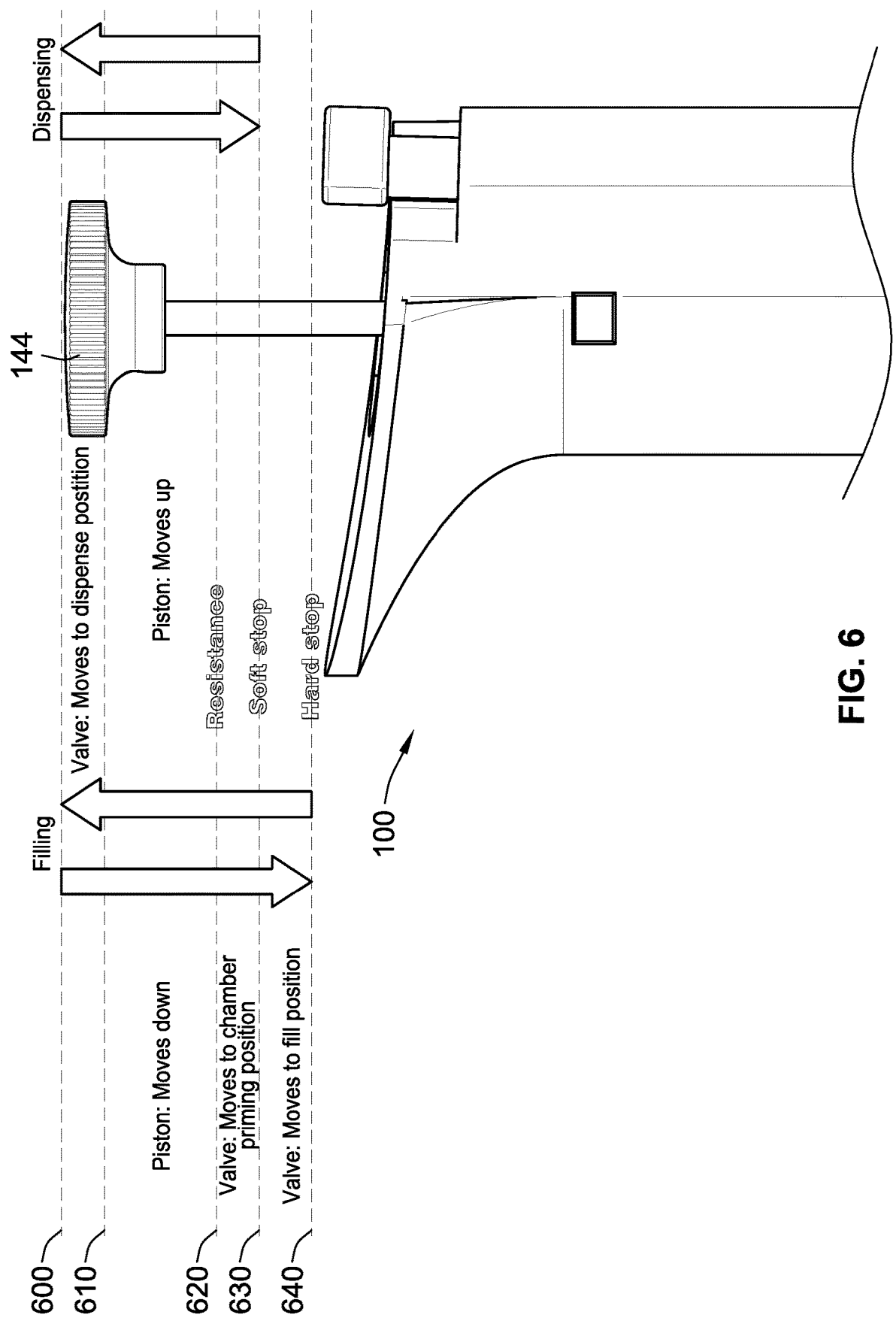

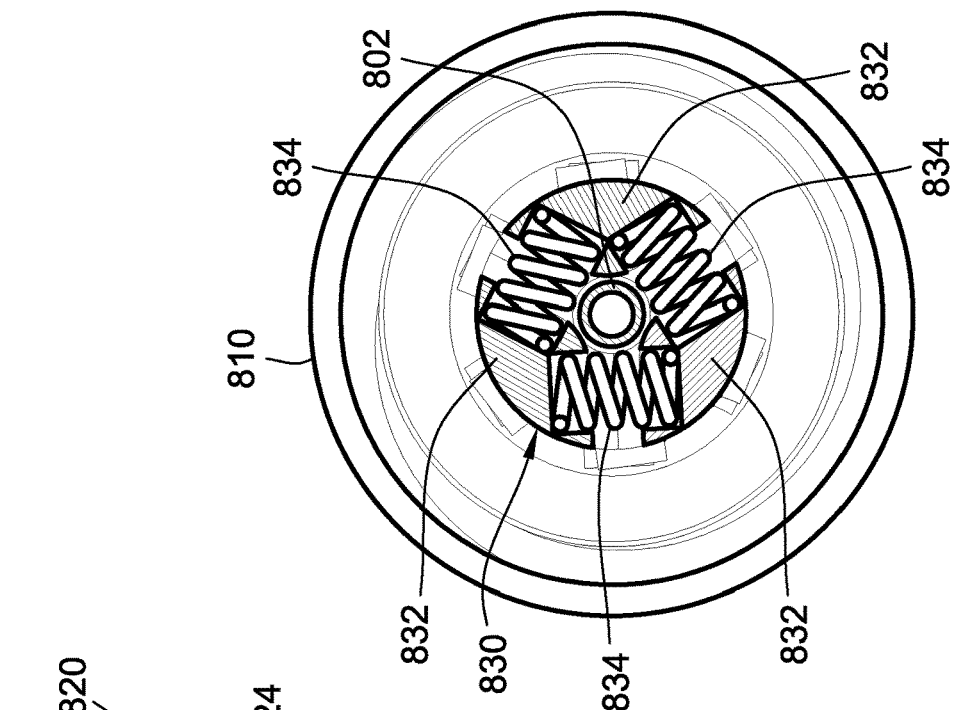
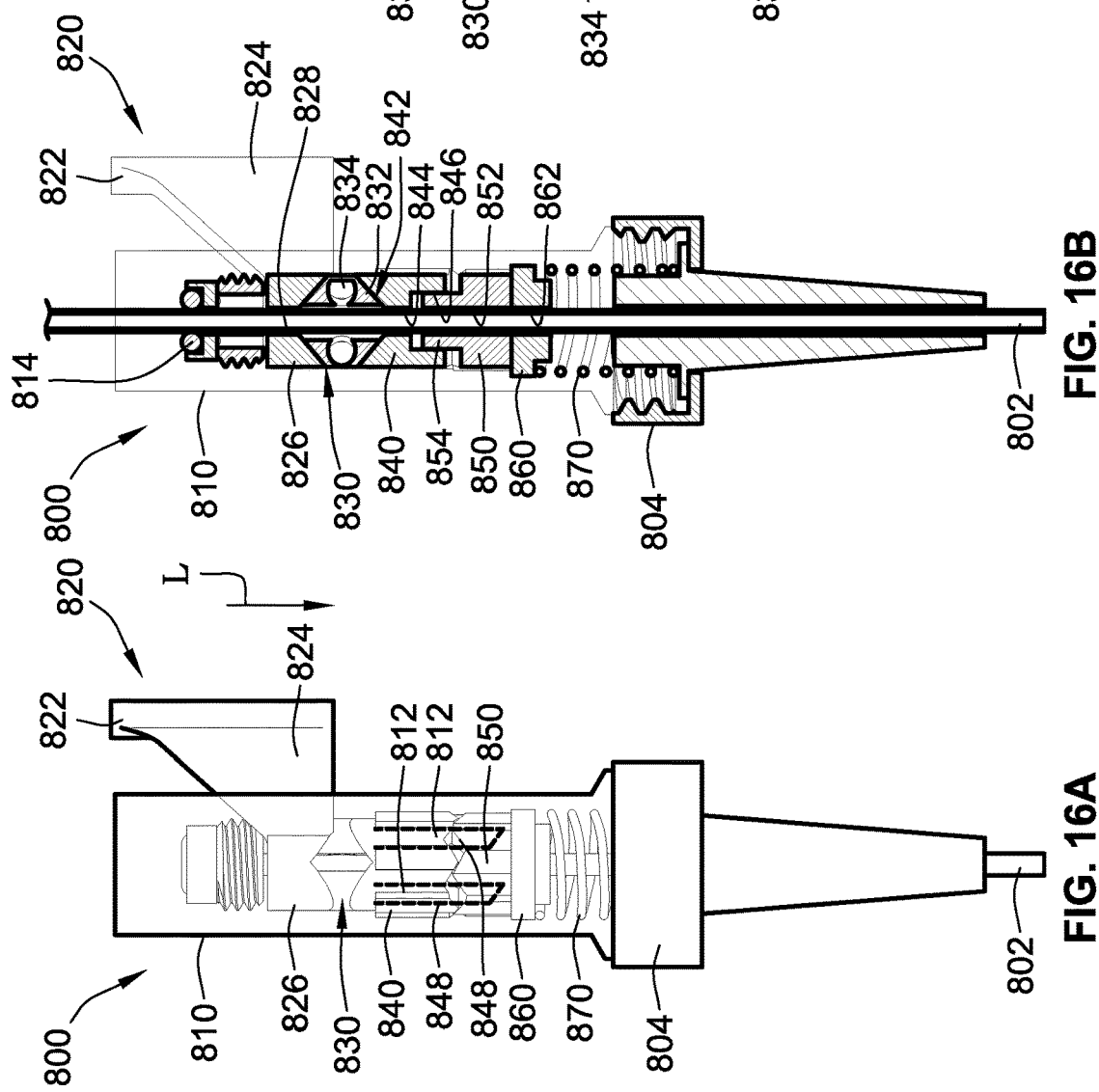
FIG. 16C
FIG. 16B
FIG. 16A

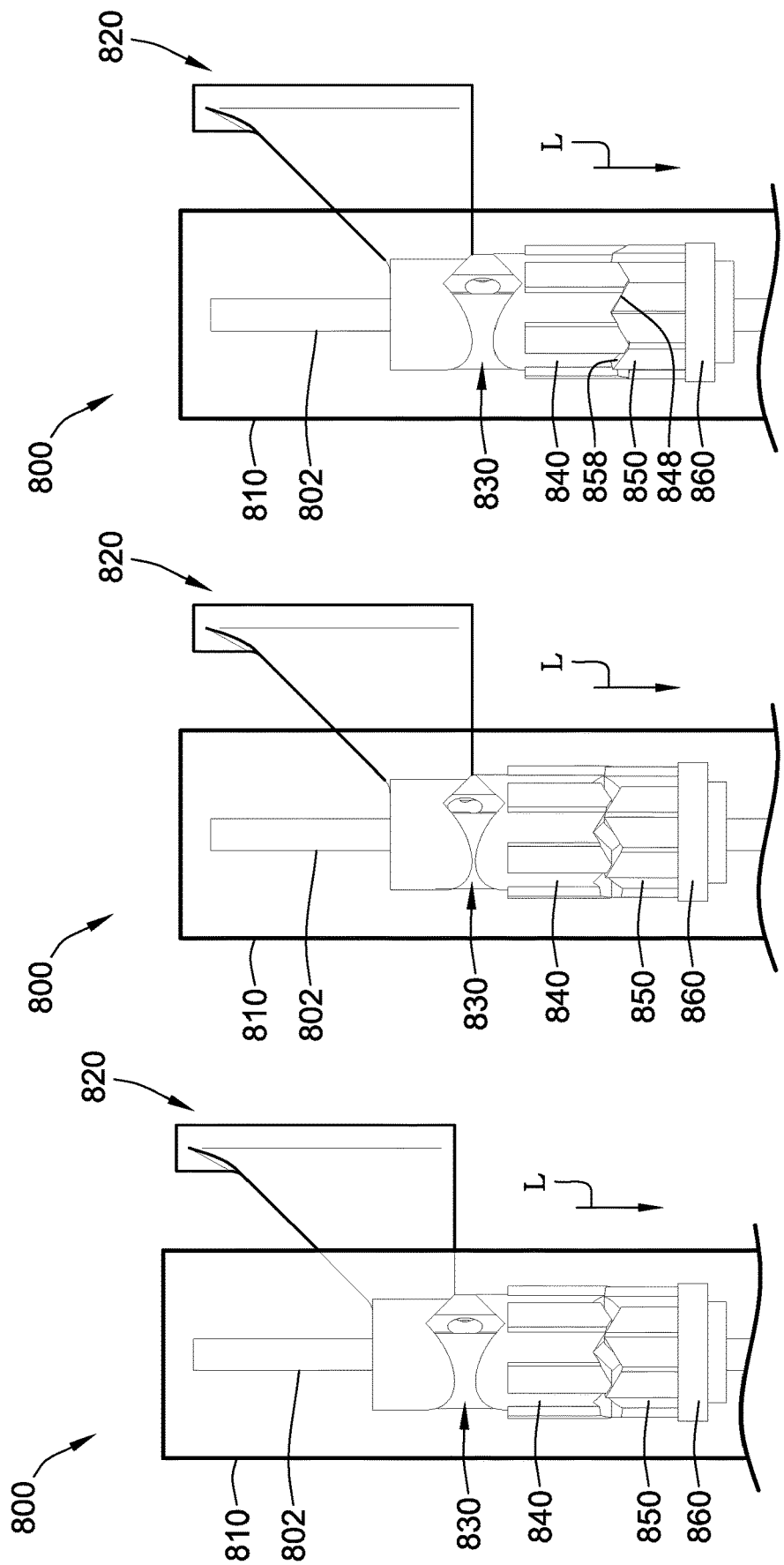

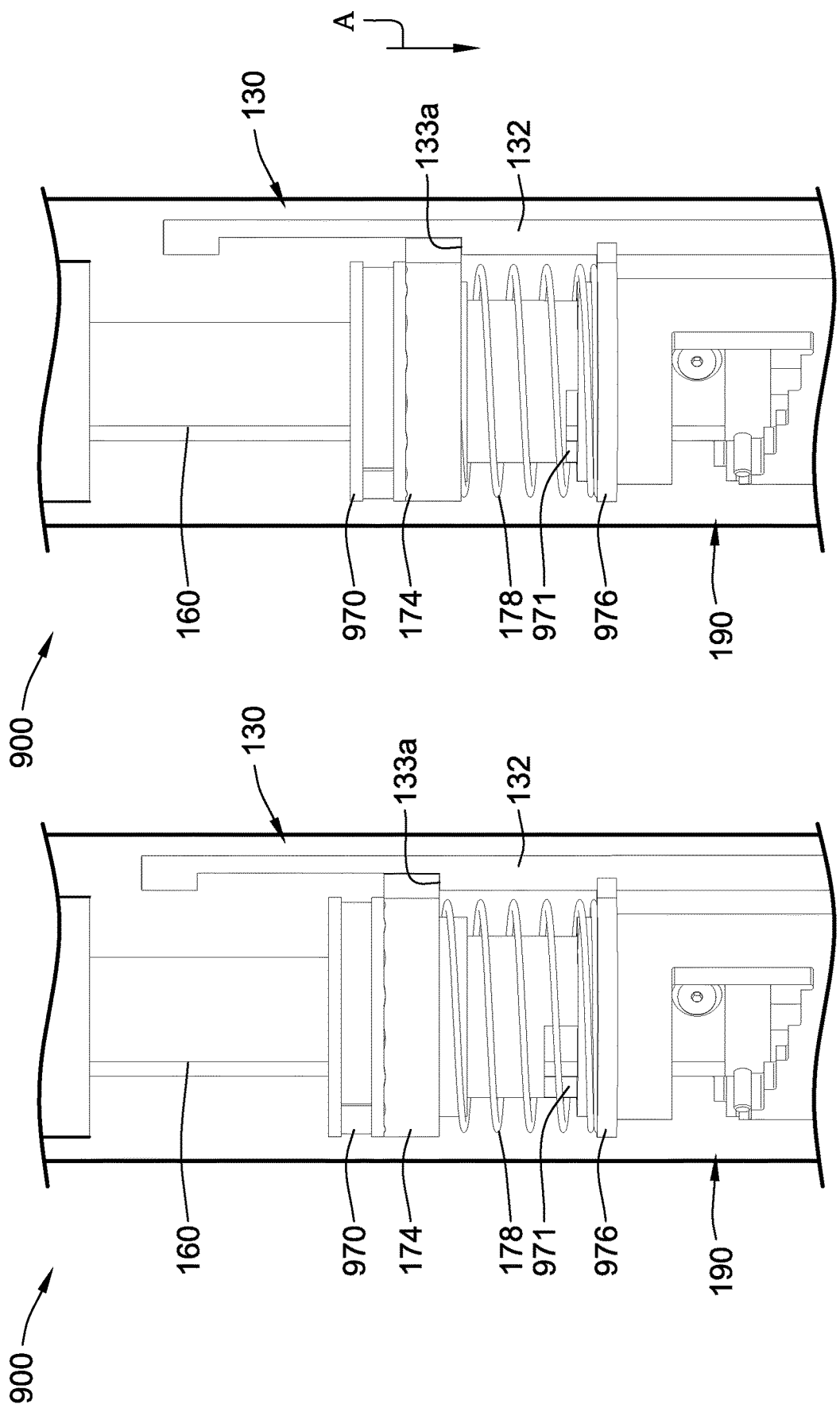

PIPETTING DEVICES AND METHODS OF USING THE SAME

CROSS-REFERENCE TO RELATED APPLICATIONS

This application is a U.S. National Stage of International Application No. PCT/US2018/018259, filed Feb. 14, 2018, which claims any and all benefits as provided by law including benefit under 35 U.S.C. § 119(e) of U.S. Provisional Application No. 62/459,361, filed Feb. 15, 2017 each of which is hereby incorporated by reference in its entirety.

STATEMENT REGARDING FEDERALLY SPONSORED RESEARCH

This invention was made with US Government support under contract U54 EB015408 awarded by the National Institute of Health. The US Government may have certain rights in this invention.

TECHNICAL FIELD

The present disclosure relates generally to devices and methods for collecting and dispensing a fluid and, more particularly, to a pipetting device for collecting and incrementally dispensing a volume of fingerstick blood.

BACKGROUND

Point-of-care ("POC") diagnostics that utilize fingerstick ("FS") blood are widely used in a variety of clinical settings. Often, it is desirable to perform multiple, separate POC tests utilizing FS blood for a patient during a given encounter. Performing multiple fingersticks can result in increased risk of infection, while attempting to collect a large volume of blood from a single fingerstick with multiple collection devices used in a series presents physical challenges for the operator (absent extensive operator training and experience) and can result in collection of an insufficient blood volume. Further, each POC test may require a different volume of blood. Finally, the use of multiple fingersticks in a single patient encounter results in cumulative discomfort and reduced testing efficiency. Thus, new devices and methods are needed for collecting blood from a fingerstick and incrementally dispensing the blood to enable the performance of multiple POC tests from a single fingerstick. The present disclosure addresses these and other problems.

SUMMARY

According to some implementations of the present disclosure, a pipetting device comprises a housing, a valve assembly, and an actuator assembly. The housing includes a tip for receiving a capillary tube and optionally, a capillary sheath. The valve assembly includes a shuttle valve and a valve rod, the shuttle valve having a filling position and a dispensing position. The actuator assembly has an actuator, a valve trigger, a piston mount, and an indexing mechanism. The actuator extends from the housing and includes a push button coupled to a push rod. The valve trigger is configured to engage the valve assembly responsive to movement of the push button and includes an aperture configured to receive the piston mount therein. The indexing mechanism is configured to index a rotated position of the push button to a predefined volume of dispensed fluid.

According to some implementations of the present disclosure, a method for using a pipetting device includes providing (i) a housing including a tip coupled to a capillary tube, (ii) a valve assembly including a shuttle valve; (iii) providing an actuator assembly including an actuator, a valve trigger, a piston mount, and an indexing mechanism. The actuator includes a push rod and a push button extending from the housing with the push rod being coupled to the push button. The indexing mechanism includes a follower and a cylindrical cam having an origin surface and a plurality of steps. The push button is rotated such that the follower is positioned over one of the plurality of steps of the cylindrical cam. The push button is pressed towards the housing such that the shuttle valve moves to a filling position. And the capillary tube is placed in a volume of fluid such that the shuttle valve causes the volume of fluid to be drawn into the capillary tube.

These and other aspects of the present invention will become more apparent from the following detailed description of the system in conjunction with the accompanying drawings.

BRIEF DESCRIPTION OF THE DRAWINGS

The accompanying drawings, which are incorporated into this specification, illustrate one or more exemplary embodiments of the inventions and, together with the detailed description, serve to explain the principles and applications of these inventions. The drawings and detailed description are illustrative, and are intended to facilitate an understanding of the inventions and their application without limiting the scope of the invention. The illustrative embodiments can be modified and adapted without departing from the spirit and scope of the inventions.

FIG. 5A is a partial cross-sectional view of the pipetting device of FIG. 1;

FIG. 5B is an enlarged perspective view of the pipetting device of FIG. 5A;

FIG. 5C is another enlarged perspective view of the pipetting device of FIG. 5A;

FIG. 6 is a partial side view of the pipetting device of FIG. 1;

FIG. 16A is a partial cross-sectional side view of a pipetting device according to some implementations of the present disclosure;

FIG. 16B is a cross-sectional side view of the pipetting device of FIG. 16A;

FIG. 16C is a cross-sectional top view of the pipetting device of FIG. 16A;

FIG. 16D is a partial cross-sectional side view of the pipetting device of FIG. 16A;

FIG. 16E is another partial cross-sectional side view of the pipetting device of FIG. 16A;

FIG. 16F is another partial cross-sectional side view of the pipetting device of FIG. 16A;

FIG. 17A is a partial cross-sectional view of a pipetting device in a dispensing mode according to some implementations of the present disclosure;

FIG. 17B is a partial cross-sectional view of the pipetting device of FIG. 17A in a filling mode according to some implementations of the present disclosure.

Figure 1:
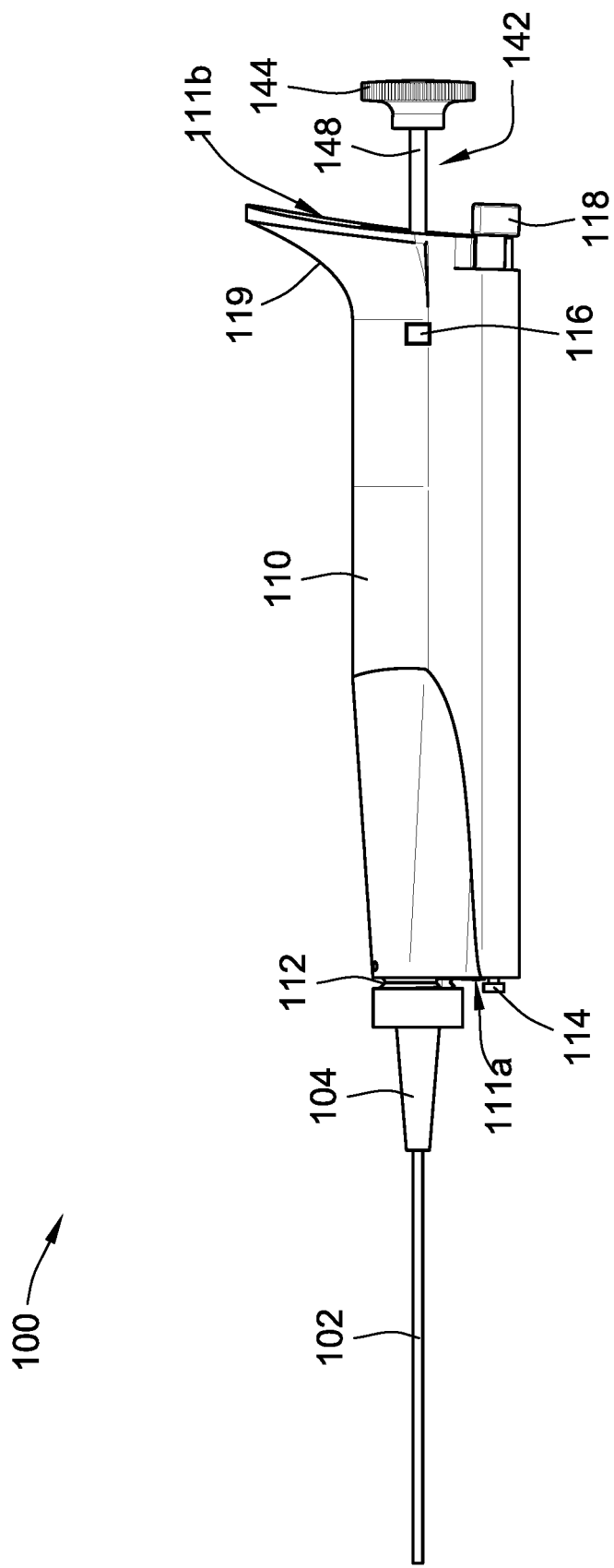
FIG. 1 is a side view of a pipetting device according to some implementations of the present disclosure.

The present disclosure is susceptible to various modifications and alternative forms, and some representative embodiments have been shown by way of example in the drawings and will be described in detail herein. It should be understood, however, that the inventive aspects of the disclosure are not limited to the particular forms disclosed. Rather, the disclosure is to cover all modifications, equivalents, and alternatives falling within the spirit and scope of the invention as defined by the appended claims.

DETAILED DESCRIPTION

Figure 2:
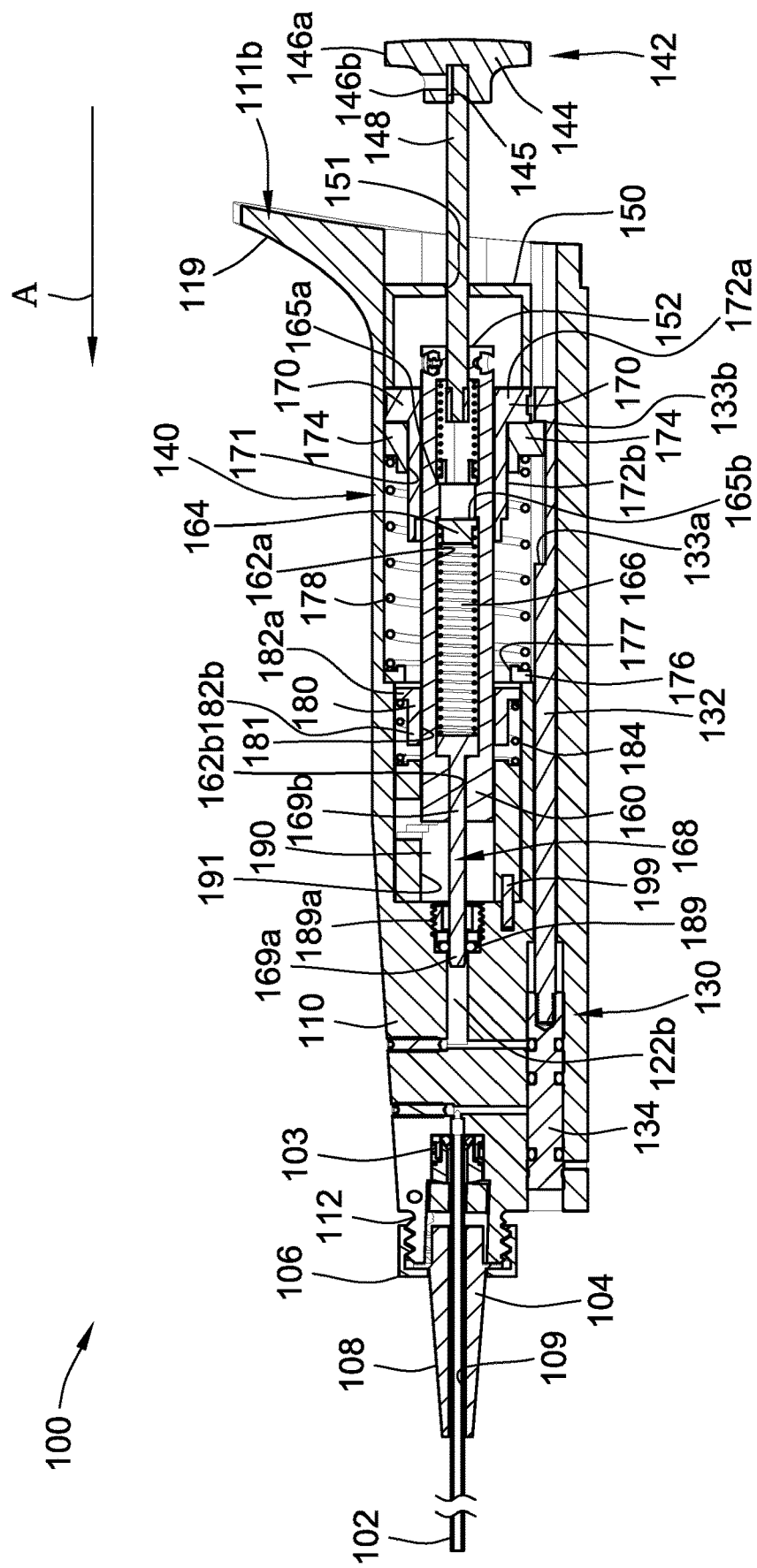
FIG. 2 is a cross-sectional side view of the pipetting device of FIG. 1.

Referring generally to FIGS. 1 and 2, a pipetting device 100 includes a capillary tube 102, a capillary sheath 104, a housing 110, a valve assembly 130, and an actuator assembly 140. Generally, the pipetting device 100 is used to collect a desired volume of fluid (e.g., fingerstick blood) and incrementally dispense one or more volumes of the fluid (e.g., as needed for one or more tests). Further, a user can selectively adjust the volume of collected fluid that is dispensed during each dispensing operation (e.g., the pipetting device can dispense a first volume of fluid during a first dispensing operation and subsequently dispense a second volume of fluid that is greater or less than the first volume during a second dispensing operation).

The capillary tube 102 is a standard capillary tube having a generally cylindrical configuration and an outer diameter of approximately 1.9 mm (0.075 inches). The capillary tube 102 has a volume that is at least 100 μL and can be marked in 10 μL graduations. In other implementations, the capillary tube 102 can have a volume that ranges between about 50 μL to about 200 μL. The capillary tube 102 can be made of a glass material or a polymer material. In such implementations where the capillary tube 102 is made from a glass material, the capillary tube 102 can be wrapped with Mylar to prevent the glass material from breaking. Additionally, the capillary tube 102 can be treated with an anti-coagulant, such as sodium heparin, ethylenediamine tetraacetic acid (EDTA), or any other suitable anti-coagulant, to aid in preventing coagulation of fingerstick blood within the capillary tube 102.

Referring generally to FIGS. 1 and 2, the capillary sheath 104 includes a base portion 106, a tapered portion 108, and a generally central aperture 109. As shown, the base portion 106 is coupled to the tip 112 of the housing 110 by a threaded connection. However, other mechanisms for coupling the capillary sheath 104 to the housing 110 can be used, such as an adhesive connection, a welded connection, a locking collar, or the like, or any combination thereof. Alternatively, the housing 110 and capillary sheath 104 can be unitary and/or monolithic. As best shown in FIG. 2, the generally central aperture 109 of the capillary sheath 104 receives the capillary tube 102 therein. While the capillary tube 102 has been described above as a standard capillary tube (e.g., a capillary tube having an outer diameter of approximately 1.9 mm), it is contemplated that the capillary sheath 104 can be sized and shaped to receive capillary tubes of varying volumes, sizes (diameters and/or lengths), and materials.

As shown in FIG. 1, the housing 110 includes the tip 112, an open capillary indicator 114, and a volume display window 116. The housing can also optionally include a capillary ejector button 118 and a flange 119. As shown, the housing 110 has a generally cylindrical configuration, although any other configurations can be used, such as, for example, a rectangular configuration, a triangular configuration, a polygonal configuration, or the like. The housing 110 serves as a handle to aid a user in grasping the pipetting device 100, and the generally cylindrical configuration of the housing 110 provides ergonomic support for the user during use of the pipetting device 100. The housing 110 can be made of, for example, a polymer material, a metal material, or the like, or any combination thereof.

Figure 3:
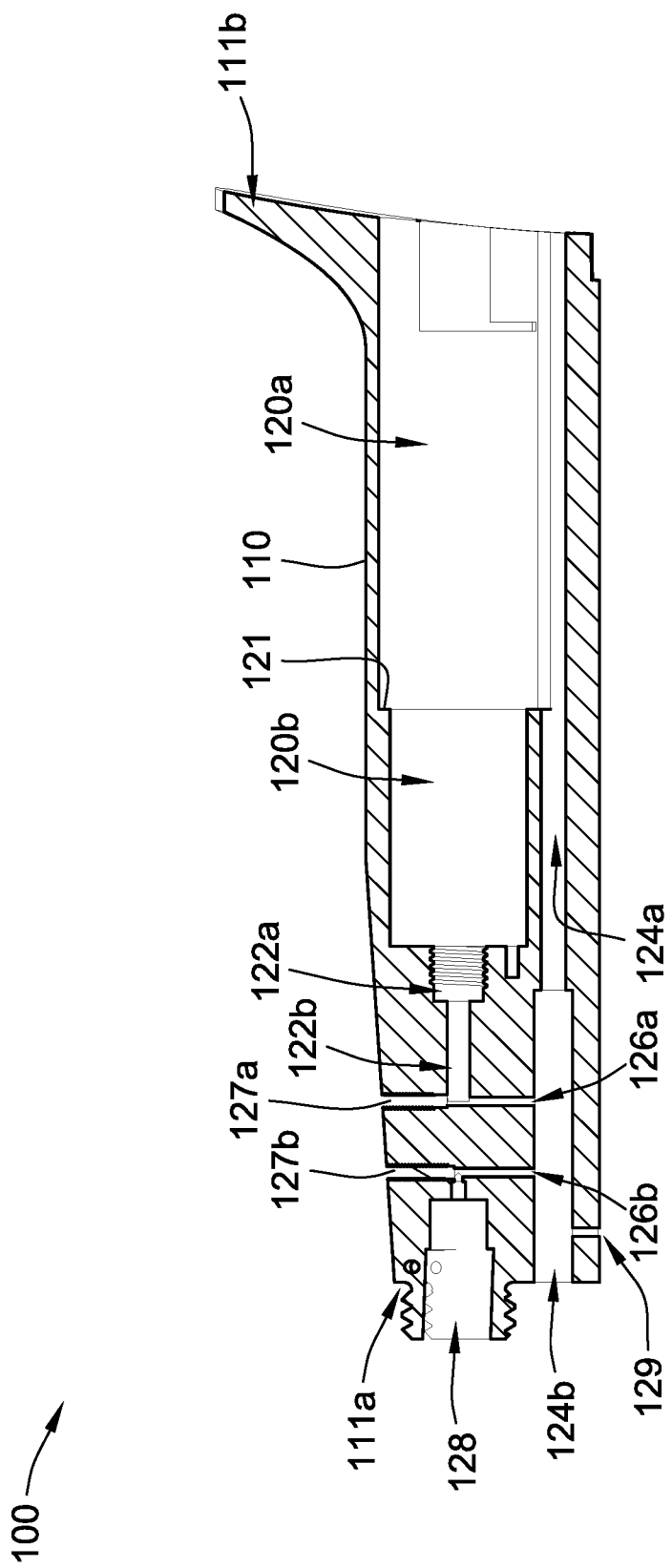
FIG. 3 is a cross-sectional side view of the pipetting device of FIG. 2 with an actuator assembly and a valve assembly removed for illustrative purposes.

Referring to FIG. 3, the housing 110 also includes an upper actuator chamber 120a, a lower actuator chamber 120b, an upper piston chamber 122a, a lower piston chamber 122b, an upper valve chamber 124a, a lower valve chamber 124b, a first air passage 126a, a second air passage 126b, a capillary chamber 128, and an outlet 129.

The upper actuator chamber 120a extends from a top surface 111b of the housing 110 towards a bottom surface 111a of the housing 110 and includes a step 121. The upper actuator chamber 120a has a generally cylindrical configuration and has a diameter that is greater than a diameter of the lower actuator chamber 120b, which also has a generally cylindrical configuration. The step 121 is defined by the change in diameter between the upper actuator chamber 120a and the lower actuator chamber 120b. As shown, the lower actuator chamber 120b and the upper actuator chamber 120a are in fluid communication with one another.

The upper piston chamber 122a is in fluid communication with the lower actuator chamber 120b and extends towards the bottom surface 111a of the housing 110. The upper piston chamber 122a has a diameter that is larger than the diameter of the lower actuator chamber 120b. The lower piston chamber 122b is in fluid communication with the upper piston chamber 122a and also extends towards the bottom surface 111a of the housing 110. Both the upper piston chamber 122a and the lower piston chamber 122b have a generally cylindrical configuration.

The lower valve chamber 124b extends from the bottom surface 111b of the housing 110 towards the top surface 111b. The lower valve chamber 124b has a diameter that is greater than a diameter of the upper valve chamber 124a. As shown, the lower valve chamber 124b is in fluid communication with the upper valve chamber 124a, and thus is in fluid communication with the upper actuator chamber 120a via the upper valve chamber 124a. Both the upper valve chamber 124a and the lower valve chamber 124b have a generally cylindrical configuration.

The first air passage 126a, second air passage 126b, and the outlet 129 are positioned generally perpendicular to the top and bottom surfaces 111b, 111a of the housing 110. The first air passage 126a is in fluid communication with the lower piston chamber 122b and the lower valve chamber 124b. As shown, the first air passage 126a has a first plug 127a, which prevents fluid from escaping the first air passage 126a and out of the housing 110. The second air passage 126b is in fluid communication with the lower valve chamber 124b and the capillary chamber 128. Like the first air passage 126a, the second air passage 126b includes a plug 127b that prevents fluid from escaping the housing 110 via the second air passage 126b. The outlet 129 extends between the lower valve chamber 124b and an exterior surface of the housing 110.

The capillary chamber 128 extends from the bottom surface 111a towards the top surface 111b of the housing 110. The capillary chamber 128 has a generally cylindrical configuration and is in fluid communication with the second air passage 126b. As shown in FIG. 2, the capillary chamber 128 includes a capillary seal 103. The capillary seal 103 receives the capillary tube 102 therein and secures the capillary tube 102 within the capillary sheath 104. In this configuration, the second air passage 126b and the capillary tube 102 are in fluid communication with one another.

Referring to FIG. 2, the valve assembly 130 of the pipetting device 100 includes a valve rod 132 and a shuttle valve 134. As shown, the valve rod 132 extends through the upper actuator chamber 120a, the upper valve chamber 124a, and the lower valve chamber 124b. The valve rod 132 has a generally cylindrical configuration and is sized and shaped such that it can move and/or slide within both the upper valve chamber 124a and the lower valve chamber 124b. The valve rod 132 has a first notch 133a (e.g., shoulder) and a second notch 133b (e.g., shoulder) formed in a portion of the valve rod 132 that is disposed within the upper actuator chamber 120a. The valve rod 132 can be made of, for example, a polymer material, a metal material, or the like, or any combination thereof.

The shuttle valve 134 is coupled to the valve rod 132 and is disposed within the lower valve chamber 124b. The shuttle valve 134 can be secured to the valve rod 132 by various mechanisms, such as, for example, a snap fit, a press fit, an adhesive connection, a welded connection, a threaded connection, a locking collar, or the like, or any combination thereof. Alternatively, the shuttle valve 134 and valve rod 132 can be unitary or monolithic. The shuttle valve 134 can be made of, for example, a polymer material, a metal material, or the like, or any combination thereof.

Figure 4A:
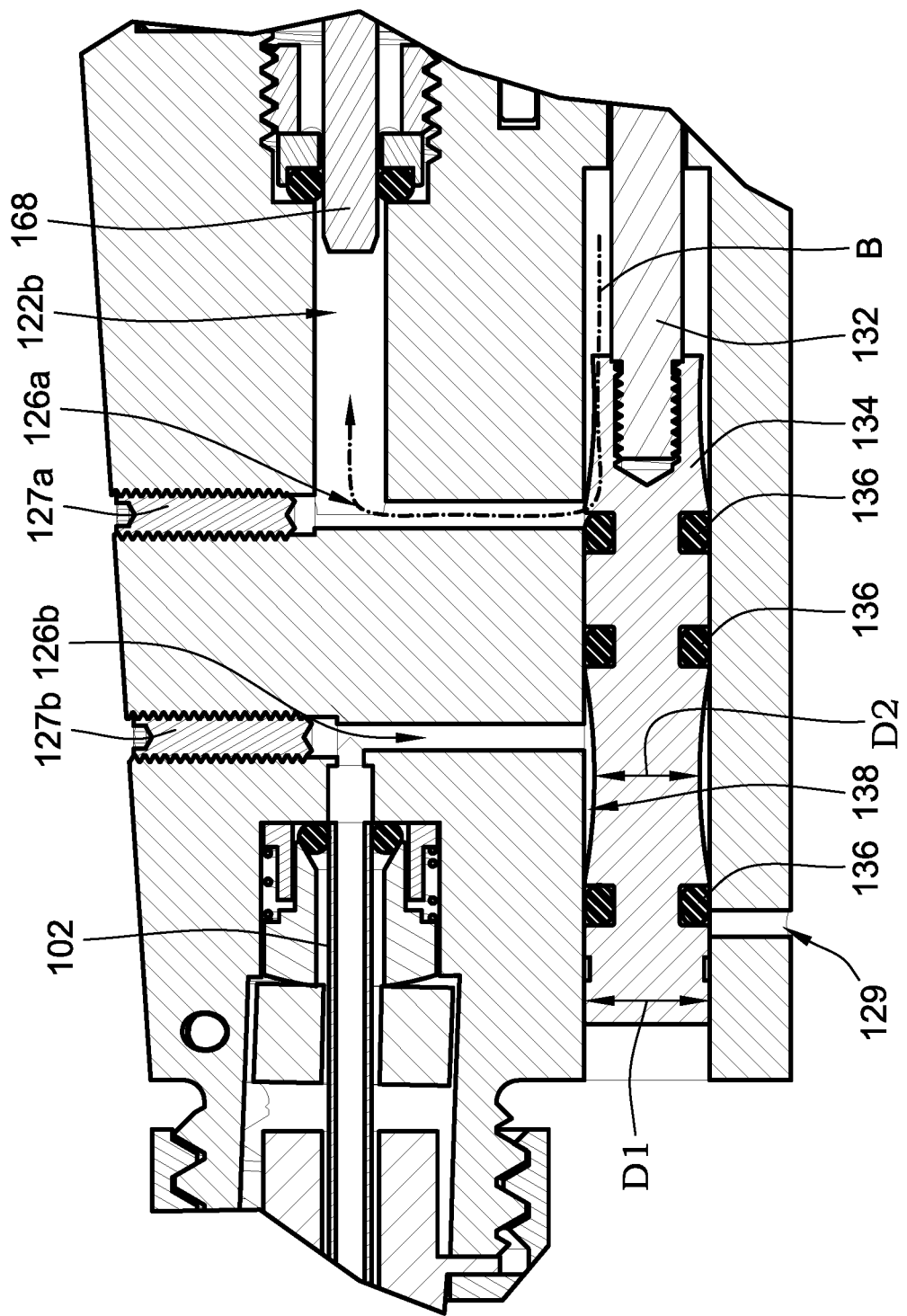
FIG. 4A is a partial cross-sectional view of the pipetting device of FIG. 1 including the valve assembly.
Figure 4B:
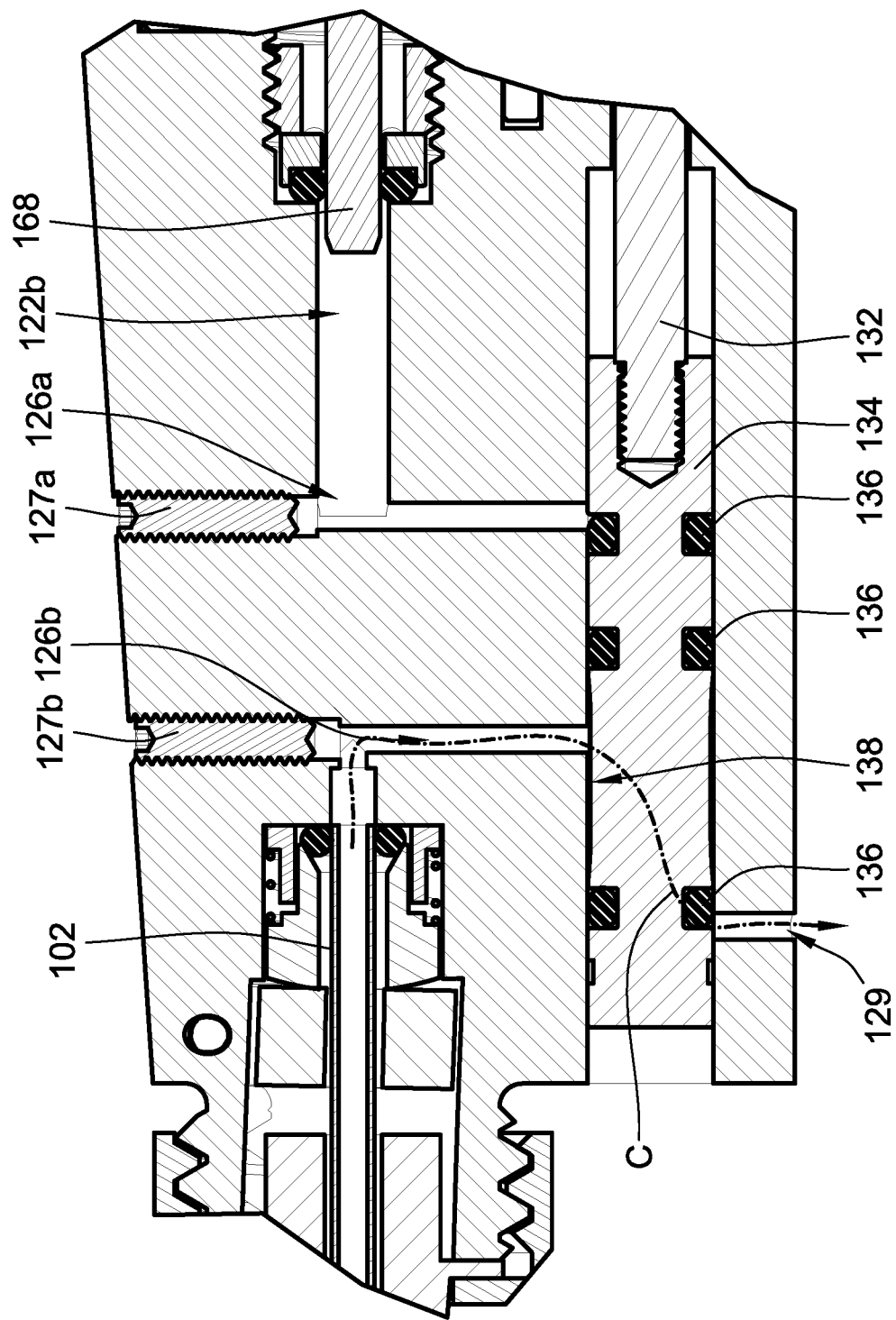
FIG. 4B is another partial cross-sectional view of the pipetting device of FIG. 1 including the valve assembly.
Figure 4C:
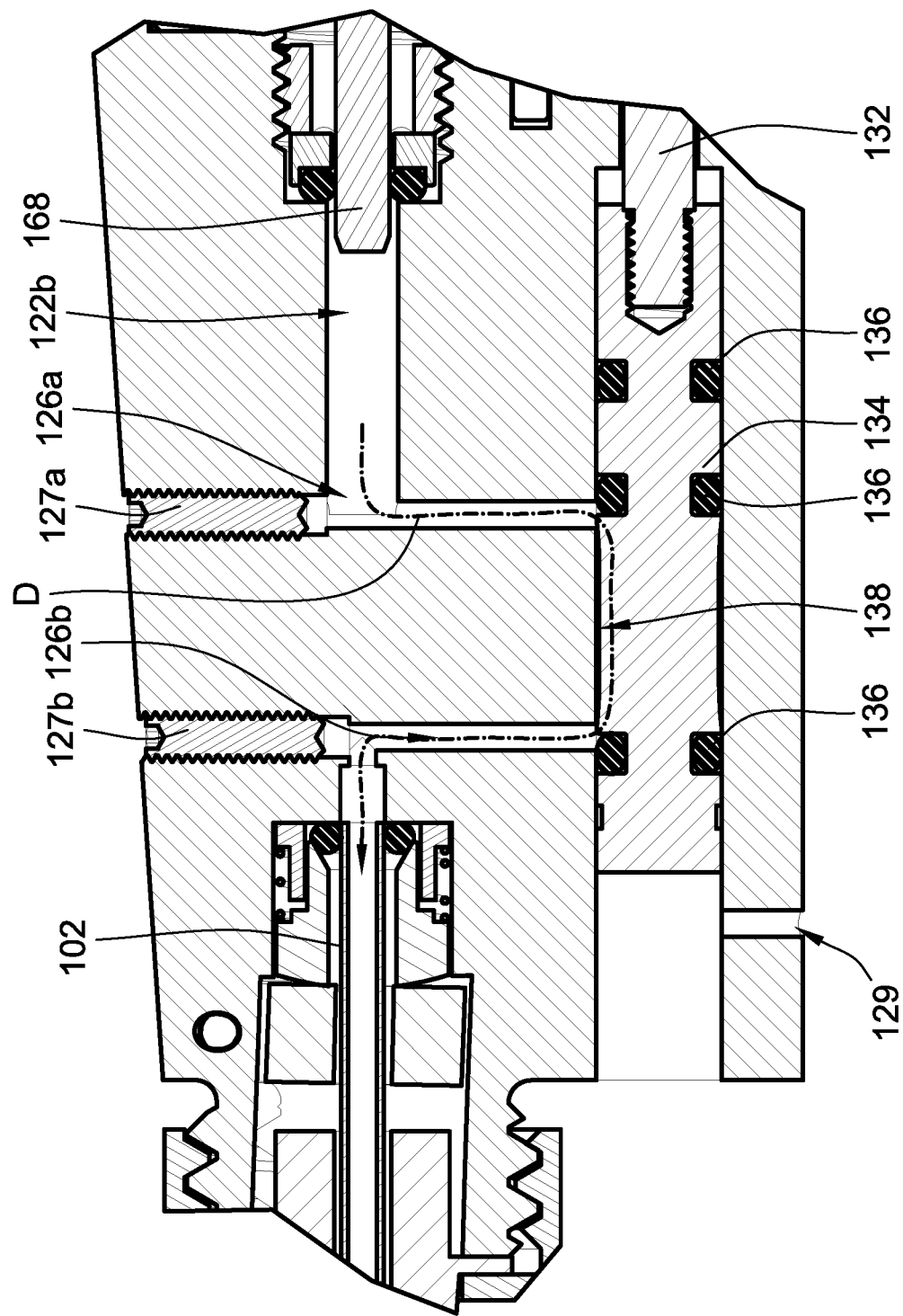
FIG. 4C is another partial cross-sectional view of the pipetting device of FIG. 1 including the valve assembly.

Generally referring to FIGS. 4A-4C, the shuttle valve 134 has a generally cylindrical configuration and is sized and shaped such that it can move and/or slide within the lower valve chamber 124b. The shuttle valve 134 has a first diameter D1, a second diameter D2, and a plurality of o-rings 136. The second diameter D2 is smaller than the first diameter D1 such that the distance between the second diameter D2 and the lower valve chamber 124b defines a gap 138. The length of the gap 138 is approximately equal to the distance between the first air passage 126a and the second air passage 126b, and is also approximately equal to the distance between the second air passage 126b and the outlet 129. The plurality of o-rings 136 aid in providing an air-tight seal between the first diameter D1 of the shuttle valve 134 and the lower valve chamber 124b. While the plurality of o-rings 136 is shown as having three o-rings, any number of o-rings can be used, such as, for example, two o-rings, eight o-rings, twenty o-rings, etc., as needed to provide appropriate seals.

The shuttle valve 134 has three operable positions. Referring to FIG. 4A, the shuttle valve 134 is in a chamber priming position. In the chamber priming position, the shuttle valve 134 is positioned within the lower valve chamber 124b such that air flows along arrow B through the lower valve chamber 124b, the first air passage 126a, and into the lower piston chamber 122b. A first one of the plurality of o-rings 136 aids in providing an air-tight seal between the first diameter D1 of the shuttle valve 134 and the lower valve chamber 124b, such that air flows along arrow B and only into the first air passage 126a. In this position, the capillary tube 102 is sealed and air fills the lower piston chamber 122b.

Referring to FIG. 4B, the shuttle valve 134 is in a filling position. In the filling position, the shuttle valve 134 is positioned within the lower valve chamber 124b such that the gap 138 is positioned between the second air passage 126b and the outlet 129. In this configuration, air flows along arrow C from the capillary tube 102, to the second air passage 126b, to the gap 138, and through the outlet 129. A second one of the plurality of o-rings 136 and a third one of the plurality of o-rings 136 aid in providing an air-tight seal between the first diameter D1 of the shuttle valve 134 and the lower valve chamber 124b, such that air flows along arrow C and only exits the gap 138 through the outlet 129. Air flow along arrow C allows a fluid to be drawn into the capillary tube 102 via capillary action. As the fluid is drawn into the capillary tube 102, the fluid displaces air in the capillary tube 102 through the outlet 129, as shown by arrow C.

Referring to FIG. 4C, the shuttle valve 134 is shown in a dispensing position. In the dispensing position, the shuttle valve 134 is positioned within the lower valve chamber 124b such that the gap 138 is positioned between the first air passage 126a and the second air passage 126b. As shown, air flows along arrow D from the lower piston chamber 122b, the first air passage 126a, the gap 138, the second air passage 126b, and through the capillary tube 102. The second one of the plurality of o-rings 136 and the third one of the plurality of o-rings 136 provide an air-tight seal between the first diameter D1 of the shuttle valve 134 and the lower valve chamber 124b, such that air flows along arrow D and only exits the gap 138 through the second air passage 126b. Air flow along arrow D as described above forces fluid stored in the capillary tube 102 to be forced out and dispensed. The amount of fluid that is dispensed from the capillary tube 102 is a function of the volume of air stored in the lower piston chamber 122b.

Referring to FIG. 2, the actuator assembly 140 of the pipetting device 100 is disposed within the upper actuator chamber 120a and the lower actuator chamber 120b of the housing 110. The actuator assembly 140 includes an actuator 142, a protective cap 150, a piston mount 160, a push rod connector 170, a valve trigger 174, a trigger base 176, a first spring 178, an optional soft stop 180, a second spring 184, and a volume adjusting mechanism 190.

The actuator 142 includes a push button 144 and a push rod 148 extending beyond the top surface 111b of the housing 110. As described in further detail below, during operation of the pipetting device 100, depressing the push button 144 controls the filling and dispensing of fluid from the capillary tube 102, and rotation of the push button 144 permits a user to select a predefined volume of fluid that will be dispensed during the next dispensing operation. The push button 144 has a generally central aperture 145, a top portion 146a, and a bottom portion 146b. The top portion 146a has a generally cylindrical configuration and has a diameter that is greater than a diameter of the bottom portion 146b. As shown in FIG. 1, the top portion 146a of the push button 144 can include a plurality of teeth positioned along its outer diameter which aid a user in rotating the push button 144 by providing friction between the push button 144 and, for example, the user's fingers. The push rod 148 has a generally cylindrical configuration and has a diameter that is smaller than the diameter of the top and bottom portions 146a, 146b of the push button 144.

As shown, the generally central aperture 145 of the push button 144 receives a first end surface of the push rod 148, thereby coupling the push button 144 to the push rod 148. Thus, movement and/or rotation of the push button 144 causes movement of the push rod 148. The push button 144 can be secured to the push rod 148 by, for example, a press fit, a snap fit, a threaded connection, an adhesive connection, a welded connection, or the like. Alternatively, the push button 144 and the push rod 148 can be unitary and/or monolithic. The push button 144 and the push rod 148 can be made of the same or different materials, such as, for example, a polymer material, a metal material, or the like, or any combination thereof.

The protective cap 150 has a generally central aperture 151 and an upper attachment structure 152. The generally central aperture 151 of the protective cap 150 receives the push rod 148 and permits translational and rotational movement of the push rod 148 therein. As shown, the protective cap 150 seals the upper actuator chamber 120a. Thus, the protective cap 150 prevents a user from placing an appendage in the upper actuator chamber 120a and being injured by a component of the actuator assembly 140. The protective cap 150 also prevents any foreign materials from entering the upper actuator chamber 120a, extending the useful life of the pipetting device 100. The protective cap 150 has a generally cylindrical configuration and can be made of, for example, a polymer material, a metal material, or the like, or any combination thereof.

The piston mount 160 includes a first generally central aperture 162a, a second generally central aperture 162b, a slider 164, a piston spring 166, and a piston 168. As shown, the piston mount 160 is disposed within, and extends between, the upper actuator chamber 120a and the lower actuator chamber 120b. The piston mount 160 has a generally cylindrical configuration and can be made of, for example, a polymer material, a metal material, or the like, or any combination thereof.

The upper attachment structure 152 of the protective cap 150 is disposed within the first generally central aperture 162a of the piston mount 160 such that the piston mount 160 is coupled to the protective cap 150. Thus, movement of the piston mount 160 causes movement of the protective cap 150, and vice versa. While shown as a threaded connection, other mechanisms for securing the upper attachment structure 152 of the protective cap 150 to the first generally central aperture 162a of the piston mount 160 can be used, such as, for example, an adhesive connection, a press fit, a snap fit, a welded connection, or the like.

As shown, the push rod 148 extends through the first generally central aperture 162a of the piston mount 160. The piston spring 166 is positioned between the piston 168 and the slider 164 such that it resists movement of the slider 164 towards the piston 168. The spring constant of the piston spring 166 can be varied to provide a desired level of resistance. In addition, the first generally central aperture 162a of the piston mount 160 includes a first screw 165a and a second screw 165b. The first screw 165a prevents the piston spring 166 from urging the slider 164 past the first screw 165a. As the push rod 148 moves within the first generally central aperture 162a of the piston mount 160 in the direction of arrow A, the push rod 148 contacts the slider 164. Thus, movement of the push rod 148 in the direction of arrow A allows the slider 164 to overcome the resistance of the piston spring 166 and also move in the direction of arrow A.

The piston 168 includes a piston head 169a and a piston rod 169b. The piston head 169a is disposed within the piston chamber 122b. The piston rod 169b is disposed within the second generally central aperture 162b and extends into the lower piston chamber 122b. Movement of the piston mount 160 causes movement of the piston 168 within the lower piston chamber 122b.

As shown, the upper piston chamber 122a (FIG. 3) includes a piston seal 189 (FIG. 2). The piston seal 189 creates an air tight seal between the piston 168, the lower piston chamber 122b, and the upper piston chamber 122a. Thus, air from the upper and lower piston chambers 122a, 122b cannot leak into the lower actuator chamber 120b. The piston seal 189 can also include a set screw 189a to hold the seal (e.g., o-ring) in place between the piston 168, the lower piston chamber 122b, and the upper piston chamber 122a. In some embodiments, the piston seal 189 can include a cup or retaining element that maintains the seal in its sealing position.

The push rod connector 170 is disposed within the upper actuator chamber 120a and has a generally central aperture 171, an upper portion 172a, and a lower portion 172b. The generally central aperture 171 receives the piston mount 160 and permits translational and rotational movement of the piston mount 160 therein. As shown, the protective cap 150 rests on the upper portion 172a of the push rod connector 170. The upper portion 172*a* and the lower portion 172*b* each have a generally cylindrical configuration, and the upper portion 172*a* has a diameter that is greater than a diameter of the lower portion 172*b*. Moreover, the diameter of the upper portion 172*a* is selected to allow the push rod connector 170 to move and/or slide within the upper actuator chamber 120*a*. The push rod 148 is coupled to the upper portion 172*a* of the push rod connector such that movement of the push rod 148 causes movement of the push rod connector 170. Various mechanisms for securing the push rod 148 to the upper portion 172*a* can be used, such as, for example, a threaded connection, an adhesive connection, a welded connection, a locking collar, or the like. The push rod connector 170 can be made of, for example, a polymer material, a metal material, or the like, or any combination thereof.

As shown in FIG. 5A, the push rod connector 170 also includes a volume label 173 affixed to an outer surface of the upper portion 172*a*. The volume label 173 is positioned such that a marking printed thereon can be viewed through the volume display window 116 (FIG. 1) of the housing 110 as the push rod connector 170 rotates.

Referring to FIG. 2, the valve trigger 174 is disposed within the upper actuator chamber 120*a* and includes a generally central aperture 175 that receives the lower portion 172*b* of the push rod connector 170 therein. Thus, movement of the push rod connector 170 in the direction of arrow A causes movement of the valve trigger 174. Like the push rod connector 170, the valve trigger 174 has a generally cylindrical configuration and can move and/or slide within the upper actuator chamber 120*a*. As shown, an outer diameter of the valve trigger 174 is greater than the diameter of the upper portion 172*a* of the push rod connector 170. The valve trigger 174 can be made of, for example, a polymer material, a metal material, or the like, or any combination thereof.

The trigger base 176 is also disposed within the upper actuator chamber 120*a* and includes a generally central aperture 177 that receives the piston mount 160 and allows movement and/or rotation of the piston mount 160 therein. The generally central aperture 177 can also receive the lower portion 172*b* of the push rod connector 170. As shown, the trigger base 176 rests on the step 121, preventing the trigger base 176 from being pushed into the lower actuator chamber 120*b* and unlike the push rod connector 170 and the valve trigger 174, sliding and/or movement of the trigger base 176 is not permitted. The trigger base 176 can be made of, for example, a polymer material, a metal material, or the like, or any combination thereof.

As shown, the first spring 178 is disposed within the upper actuator chamber 120*a* and is positioned between the trigger base 176 and the valve trigger 174. The first spring 178 has an outer diameter that is about the same as the diameter of the upper actuator chamber 120*a* such that the first spring 178 surrounds the lower portion 172*b* of the push rod connector 170 and the piston mount 160. Because the trigger base 176 is positioned on the step 121, the trigger base 176 serves as a fixed end for the first spring 178. The first spring 178 resists movement of the valve trigger 174 and the push rod connector 170 in the direction of arrow A, and urges the push rod connector 170 and the valve trigger 174 in the opposite direction of arrow A. The spring constant of the first spring 178 can be varied to provide a desired level of resistance.

In some implementations, the actuator assembly optionally includes a soft stop 180. The soft stop 180 is disposed within the lower actuator chamber 120*b* and has a generally central aperture 181, an upper portion 182*a*, and a lower portion 182*b*. The generally central aperture 181 receives the piston mount 160 and permits translational and rotational movement of the piston mount 160 therein. Additionally, the soft stop 180 is capable of moving and/or sliding within the lower actuator chamber 120*b*. The upper portion 182*a* and the lower portion 182*b* both have a generally cylindrical configuration, and the upper portion 182*a* has a diameter that is greater than a diameter of the lower portion 182*b*. The soft stop 180 can be made of, for example, a polymer material, a metal material, or the like, or any combination thereof.

As shown, the second spring 184 is disposed in the lower actuator chamber 120*b* and is positioned between a cylindrical cam indexing mechanism 190A of the volume adjusting mechanism 190 and the upper portion 182*a* of the soft stop 180. The second spring 184 has an outer diameter sized such that the second spring 184 surrounds the lower portion 182*b* of the soft stop 180. Like the first spring 178, the second spring 184 resists movement of the soft stop 180 in the direction of arrow A (i.e., towards the volume adjusting mechanism 190), and generally urges the soft stop 180 in the opposite direction of arrow A. The spring constant of the second spring 184 can be varied to provide a desired level of resistance.

The volume adjusting mechanism 190, as shown in FIGS. 2 and 5A-5C, includes cylindrical cam indexing mechanism 190A and a follower 188. As described in further detail below, the volume adjusting mechanism 190 controls the volume of fluid that is dispensed from the capillary tube 102 during operation of the pipetting device 100. The indexing mechanism 190A includes a generally cylindrical central aperture 191, a cutout 193, and a locking pin 199. The indexing mechanism 190A is disposed within the lower actuator chamber 120*b* and has a generally cylindrical configuration. As shown in FIG. 2, the locking pin 199 engages a slot formed in the housing 110 such that the locking pin 199 aids in maintaining the position of the indexing mechanism 190A within the lower actuator chamber 120*b*. As such, the indexing mechanism 190A remains fixed in the lower actuator chamber 120*b* despite movement of other components of the actuator assembly 140. The indexing mechanism 190A can be made of, for example, a polymer material, a metal material, or the like, or any combination thereof.

Generally referring to FIGS. 5A-5C, the cutout 193 that forms the indexing mechanism 190A includes a first end surface 194*a*, a second end surface 194*b*, a plurality of steps 196, and an origin surface 198. As depicted, the origin surface 198 extends between the first end surface 194*a* and the second end surface 194*b* of the cutout 193. Each of the plurality of steps 196 has a varying depth relative to the origin surface 198 such that the plurality of steps 196 forms a staircase-like arrangement. While the plurality of steps 196 is shown as having eleven steps, any number of steps can be provided, such as, for example, three steps, nine steps, twenty steps, fifty steps, etc.

The follower 188 (e.g., a dowel pin, a round pin, a square pin, or any other suitable follower, or any combination thereof) is affixed to the piston mount 160 and extends generally perpendicular to a central axis of the indexing mechanism 190A. The follower can be made of, for example, a polymer material, a metal material, or the like, or any combination thereof. The generally central aperture 191 of the indexing mechanism 190A receives the piston mount 160 and permits translational and/or rotational movement of the piston mount 160 therein. Thus, rotation of the piston mount 160 causes rotation of the follower 188 (e.g., pivoting about the central axis) within the cutout 193 along the origin surface 198 between the first end surface 194*a* and the second end surface 194*b*.

Referring to FIG. 5A, the follower 188 contacts the origin surface 198 of the cutout 193 of the indexing mechanism 190A when the push button 144 is positioned as shown in FIG. 2. In this configuration, as described above, the follower 188 can rotate along the origin surface 198 between the first end surface 194*a* and the second end surface 194*b* of the cutout 193. As the piston mount 160 is rotated clockwise (i.e., such that the follower 188 rotates towards the first end surface 194*a* of the cutout 193), the first end surface 194*a* prevents further rotation of the piston mount 160 in the clockwise direction when the follower 188 contacts the first end surface 194*a*. Likewise, as the piston mount 160 is rotated counterclockwise (i.e., such that the follower 188 rotates towards the second end surface 194*b* of the cutout 193), the second end surface 194*b* prevents further rotation of the piston mount 160 in the counterclockwise direction when the follower 188 contacts the second end surface 194*b*.

During rotation of the piston mount 160, each angular position of the follower 188 along the origin surface 198 between the first end surface 194*a* and the second end surface 194*b* corresponds to a corresponding one of the plurality of steps 196. As shown in FIGS. 5B and 5C, when the piston mount 160 moves distally (e.g., along the central axis) from the origin surface 198 towards the plurality of steps 196, the follower 188 engages one of the plurality of steps 196, thereby preventing further movement of the piston mount 160. More specifically, the follower 188 engages the corresponding one of the plurality of steps 196 over which the follower 188 was positioned via rotation of the piston mount 160 (FIG. 5A) prior to moving towards the plurality of steps 196. In this manner, the corresponding one of the plurality of steps 196 controls the distance that the follower 188, and thus the piston mount 160, travels. For example, the corresponding one of the plurality of steps 196 in FIG. 5C allows the piston mount 160 to travel further downwards than the corresponding one of the plurality of steps 196 in FIG. 5B. As a result, the plurality of steps 196 of the indexing mechanism 190A control the distance that the piston mount 160 moves towards the upper and lower piston chambers 122*a*, 122*b* (FIGS. 2 and 3).

The number of steps in the plurality of steps 196 corresponds to the number of distances that the piston mount 160 is permitted to travel. For instance, a plurality of steps having eleven steps permits the piston mount 160 to travel eleven different distances. The number of steps in the plurality of steps 196 can be varied as described above to achieve a different number of permissible distances that the piston mount 160 can travel. In turn, as described in further detail below, the number of steps in the plurality of steps 196 (and the number of permissible distances that the piston mount 160 can travel) is equal to the number of different dispensing volumes a user can select during operation of the pipetting device 100.

Referring to FIG. 4C, when the shuttle valve 134 is in the dispensing position described above, movement of the piston 168 of the piston mount 160 in the lower piston chamber 122*b* towards the first air passage 126*a* forces air along arrow D. As also described above, air flow along arrow D forces fluid stored in the capillary tube 102 to be dispensed as a proportion of the volume of air stored in the chamber. As a result, movement of the piston mount 160 and piston 168 via the push button 144 and push rod 148 in the direction of arrow A (FIG. 2) causes fluid to be dispensed from the capillary tube 102. The distance that the piston 168 travels in the lower piston chamber 122*b* towards the first air passage 126*a* controls the amount of fluid that is dispensed from the capillary tube 102. Because the plurality of steps 196 control the distance that the piston mount 160 can travel (FIGS. 5A-5C), the indexing mechanism 190A controls the distance that the piston 168 extends into the lower piston chamber 122*b*, and consequently, the volume of fluid that is dispensed from the capillary tube 102.

By tightly controlling the distance that the piston 168 travels, the volume adjustment mechanism 190 allows a volume of fluid ranging between 5 µL and 50 µL to be accurately dispensed from the capillary tube 102. For instance, referring generally to FIGS. 5A-5C, the one of the plurality of steps 196 that abuts the first end surface 194*a* of the cutout 193 corresponds to the shortest distance that the piston 168 is permitted to travel, which corresponds to a dispense volume of 5 µL. Conversely, the one of the plurality of steps 196 that abuts the second end surface 194*b* of the cutout 193 corresponds to the maximum distance that the piston mount 160 is permitted to travel, which corresponds to a dispense volume of 50 µL. Because there are eleven steps in the plurality of steps 196, each one of the plurality of steps 196 corresponds to a 5 µL incremental change in dispensing volume (i.e., a first step dispenses 0 µL, a second step dispenses 5 µL, a third step dispenses 10 µL, a fourth step dispenses 15 µL, a fifth step dispenses 20 µL, a sixth step dispenses 25 µL, a seventh step dispenses 30 µL, an eighth step dispenses 35 µL, a ninth step dispenses 40 µL, a tenth step dispenses 45 µL, and an eleventh step dispenses 50 µL). Desirably, each of the plurality of steps 196 are machined to a tolerance of ±0.0005 inches from the origin surface 198 to accurately control the volume that each step dispenses. Alternatively, the number and geometry of the plurality of steps 196 can be varied to dispense any desired range of dispense volumes at any desired increment (e.g., 1 µL increments, 3 µL increments, 10 µL increments, 20 µL increments, 50 µL increments, etc.) The volume dispensed by each step can be predetermined as a function of the height of the step and area of the piston 168 or lower piston chamber 122*a*. In this manner, the indexing mechanism 190A indexes the rotated position of the push button 144 to a predetermined volume of dispensed fluid.

As described above, the push rod connector 170 includes a volume label 173 that can be viewed by a user through the volume display window 116 of the housing 110 (FIG. 1). The volumes that are printed on the volume label 173 correspond to the dispense volume of the corresponding one of the plurality of steps 196 described above. For instance, if the follower 188 is positioned over the second step of the plurality of steps 196 via rotation of the push button 144, a "10 µL" marking on the volume label 173 will be visible through the volume display window 116 (FIG. 1).

Alternatively, in some implementations, the piston mount 160 includes a cam portion which is similar to the indexing mechanism 190A in that it includes a plurality of steps that are formed on a bottom surface of the piston mount 160. Further, in such implementations, a housing (not shown) includes a follower (not shown) extending therefrom which is the same or similar to the follower 188 of the volume adjustment mechanism 190 (FIGS. 5A-5C). The housing is similar to the indexing mechanism 190A of FIG. 2 in that it is positioned within the lower actuator chamber 120*b* and is stationary. In such implementations, rotation of the push button 144 causes the plurality of steps (not shown) to rotate in the same or similar manner as the follower 188 of the volume adjusting mechanism 190 (FIG. 5A-5C). As such, each angular position of the push button 144 positions one of the plurality of steps (not shown) over the follower (not shown). Thus, the cam portion (not shown) of the piston mount 160 and follower (not shown) index the rotated position of the push button 144 to a predefined volume of dispensed fluid in the same or similar manner as indexing mechanism 190A.

Referring to FIG. 6, during operation of the pipetting device 100, the push button 144 can be moved between position 600, position 610, position 620, position 630, and position 640. Position 600 corresponds to the position of the push button 144 as shown in FIGS. 1-3.

As the push button 144 moves from position 600 towards position 610, the push rod 148 causes the protective cap 150, the piston mount 160, the push rod connector 170, and the valve trigger 174 to move in the direction of arrow A (FIG. 2). As described above, the first spring 178 and the piston spring 166 resist movement of the push button 144 towards position 620. As the push button 144 moves between position 610 and 620 (FIG. 6), the piston 168 of the piston mount 160 (FIG. 2) extends into the lower piston chamber 122b towards the first air passage 126a.

As described above, the volume adjustment mechanism 190 controls the distance that the piston mount 160 is permitted to move as the push button 144 moves from position 600 towards position 640. However, as previously described, the slider 164 moves with the push rod 148, and the piston spring 166 provides resistance against movement of the push rod 148 in the direction of arrow A (FIG. 2). Thus, even where the follower 188 prevents further movement of the piston mount 160 towards the upper piston chamber 122a, the slider 164 allows the push rod 148 to continuing moving the push rod connector 170 and the valve trigger 174 in the direction of arrow A (FIG. 2).

As the push button 144 moves between position 620 and position 630 (FIG. 6), the valve trigger 174 (e.g., at least a portion of the valve trigger 174) engages the first notch 133a of the valve rod 132 (FIG. 2), moving the valve assembly 130 in the direction of arrow A. When the push button 144 reaches position 630, the lower portion 172b of the push rod connector 170 protrudes through the trigger base 176 and contacts the soft stop 180 (FIG. 2). The soft stop 180 provides resistance against movement of the push button 144. Further, at position 630 (FIG. 6), the valve trigger 174 moves the shuttle valve 134 via the valve rod 132 into the chamber priming position described above (FIG. 5A). The air flow along arrow A (FIG. 5A) retracts the piston 168 and refills the lower piston chamber 122b with air in preparation for the process described above to be repeated after the push button 144 returns to position 600.

Referring to FIG. 6, as the push button 144 moves between position 630 and 640, the lower portion 172b of the push rod connector 170 moves the soft stop 180 towards the indexing mechanism 190A (FIG. 2). In this configuration, the second spring 184 (FIG. 2) provides additional resistance against movement of the push button 144 towards position 640 (FIG. 6).

When the push button 144 reaches position 640 (FIG. 6), the soft stop 180 contacts the indexing mechanism 190A and prevents the push button 144 from moving any further. In addition, the shuttle valve 134 moves into the filling position described above (FIG. 5B) at position 640.

When the push button 144 is released from position 640, the first spring 178, the piston spring 166, and the second spring 184 (FIG. 2) urge the push button 144 to move towards position 600. As the push button 144 travels from position 640 to position 630 (FIG. 6), the shuttle valve 134 transitions from the filling position (FIG. 5B) to the chamber priming position (FIG. 5C). During this transition, the gap 138 of the shuttle valve 134 moves up to prevent air flow along arrow C (FIG. 5B). Thus, any fluid drawn into the capillary tube 102 is prevented from leaking from the capillary tube 102 and out of the pipetting device 100.

As the push button 144 moves from position 620 to position 610 (FIG. 6), the piston 168 moves up from the lower piston chamber 122b towards the upper piston chamber 122a. Finally, with the push button 144 retracted to position 600, the shuttle valve 134 moves to the dispense position described above (FIG. 5C).

Now referring to FIGS. 7-10B, a method of operating the pipetting device 100 is described. The pipetting device 100 described herein is used to draw blood from a fingerstick test and accurately dispense separate volumes of blood. To accomplish this task, the pipetting device 100 has two operative modes: a filling mode and a dispensing mode.

Figure 7:
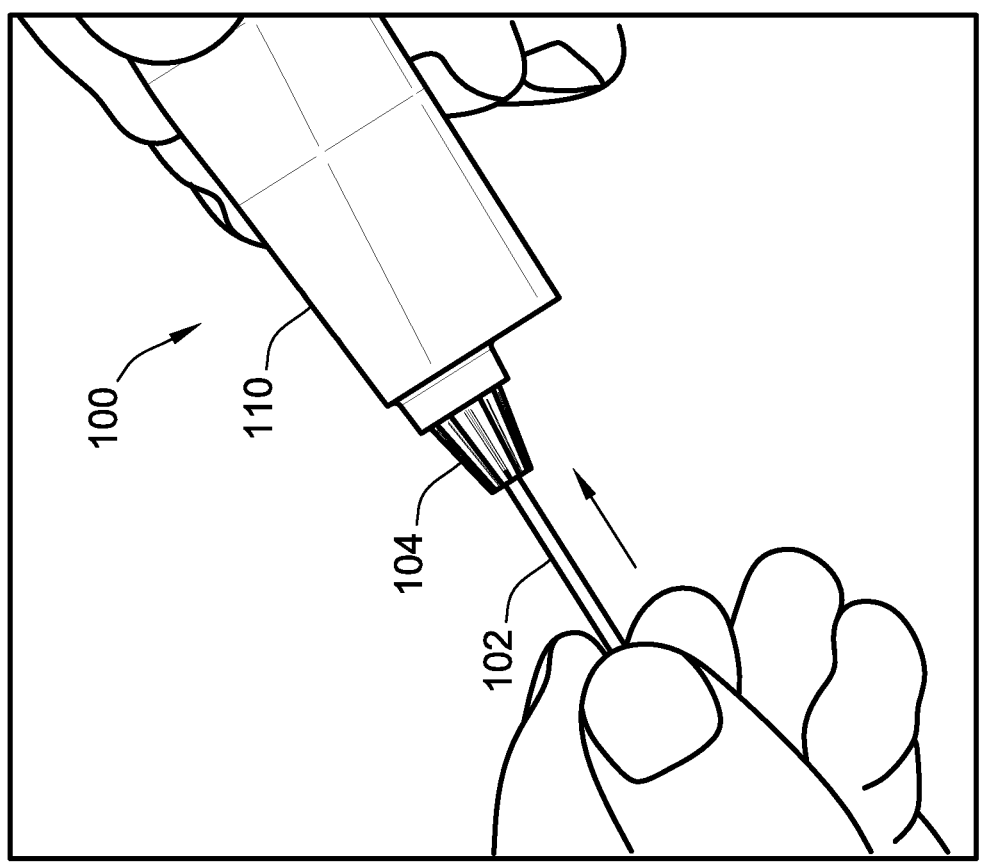
FIG. 7 is a partial perspective view of a user operating the pipetting device of FIG. 1.

To use the pipetting device 100, a user first inserts the capillary tube 102 into the capillary sheath 104, as shown in FIG. 7. The capillary tube 102 is secured within the capillary sheath 104 via the capillary seal 103 described above.

Figure 8B:
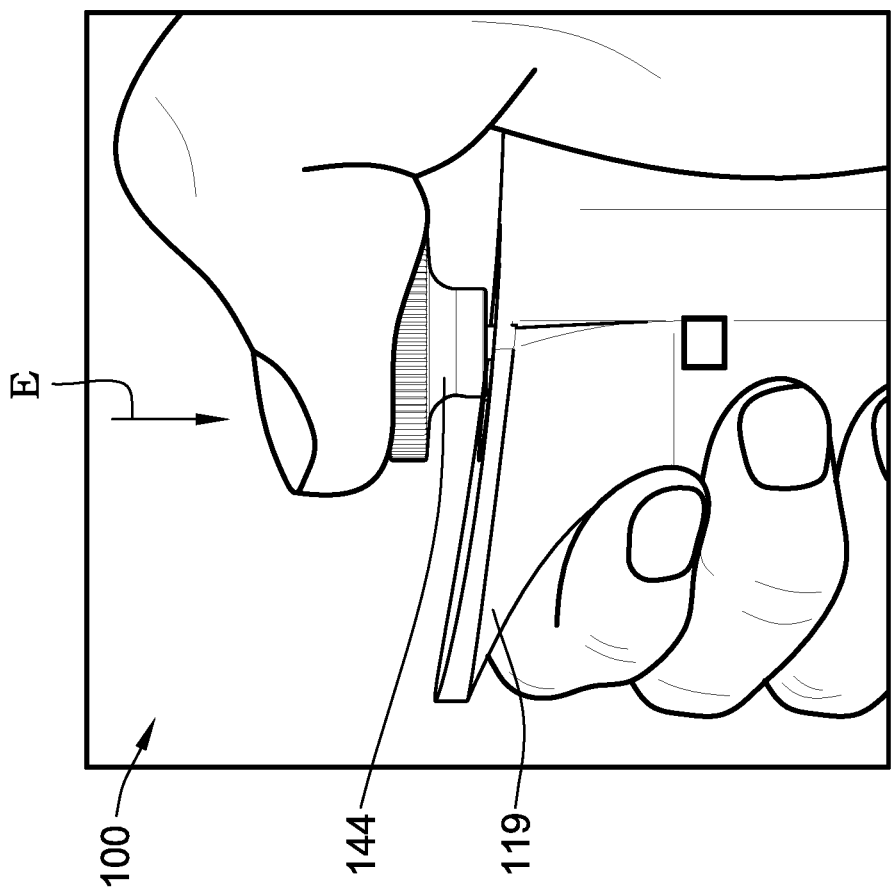
FIG. 8B is a partial perspective view of a user operating the pipetting device of FIG. 1 in the filling mode.
Figure 8A:
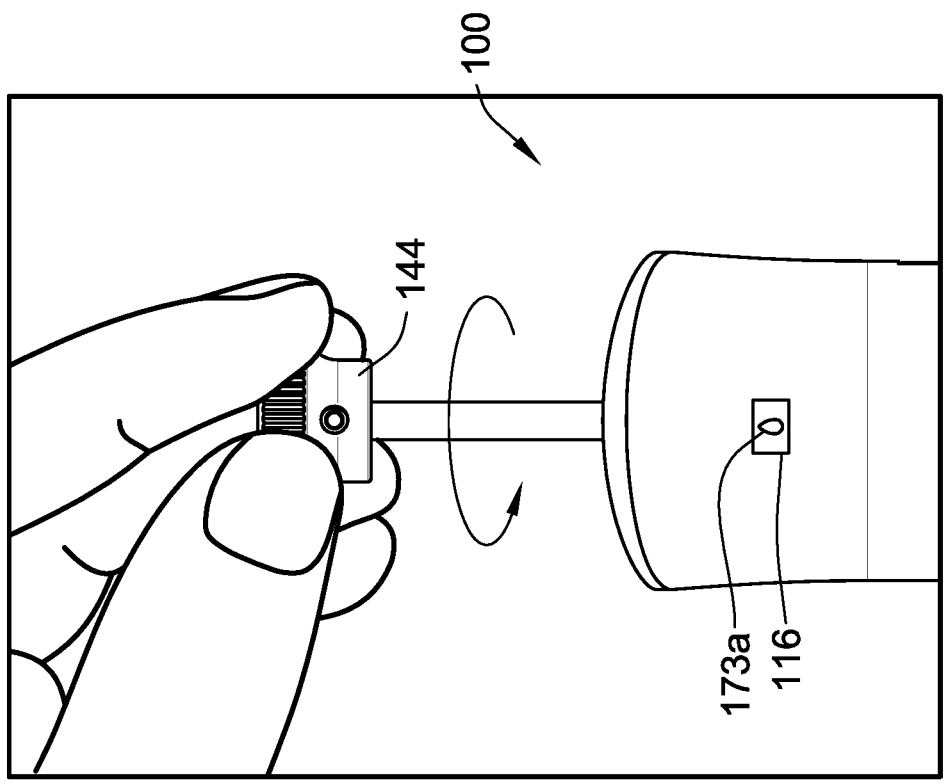
FIG. 8A is a partial perspective view of a user transitioning the pipetting device of FIG. 1 into a filling mode.

In order to toggle the pipetting device 100 into the filling mode, the user rotates the push button 144 clockwise as shown in FIG. 8A until a filing indicator 173a is visible through the volume display window 116. In addition, the open capillary indicator 114 indicates that the capillary tube 102 is ready to begin the filling operation. As shown in FIG. 8B, the user then presses the push button 144 in the direction of arrow E (corresponding to arrow A in FIG. 2). The flange 119 of the housing 110 aids the user in moving the push button 144 by providing a surface for a user's fingers to gain leverage. As shown, the user's thumb can be placed on the push button 144 and one or more of the user's fingers can be placed on the flange 119, thus aiding the user in gaining leverage to overcome the resistance caused by the actuator assembly 140 described above. The user presses the push button 144 in the direction of arrow E until it no longer moves (corresponding to position 640 shown in FIG. 6).

Figure 9:
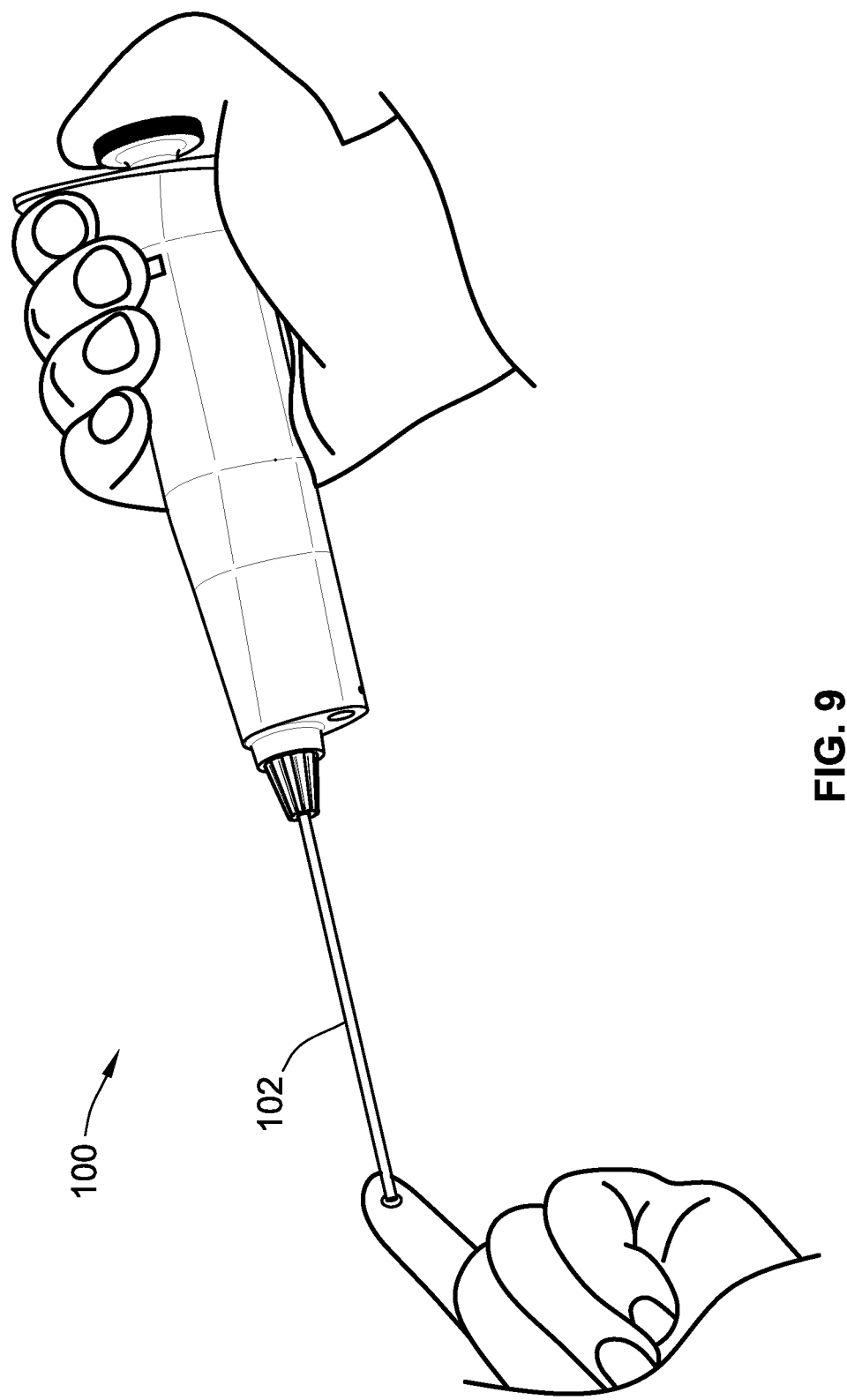
FIG. 9 is a perspective view of a user operating the pipetting device of FIG. 1 in the filling mode.

Referring to FIG. 9, the user then positions the pipetting device 100 horizontally with an end of the capillary tube 102 disposed in a volume of blood, while continuing to press the push button 144. The user continues to depress push button 144 until the desired volume of blood (e.g., the volume of blood required for a test) is drawn into the capillary tube 102. Once the desired volume of blood is achieved (e.g., 10 µL, 20 µL, 30 µL, 60 µL, 90 µL, etc.), the user releases the push button 144, thereby preventing more blood from being drawn into the capillary tube 102 and preventing previously drawn blood from escaping. As described above, the capillary tube 102 has a volume of at least 100 µL, thus allowing the user to draw up to approximately 100 µL of blood into the capillary tube 102, although other maximum starting volumes are possible depending on the maximum volume of the capillary tube 102.

Figure 10B:
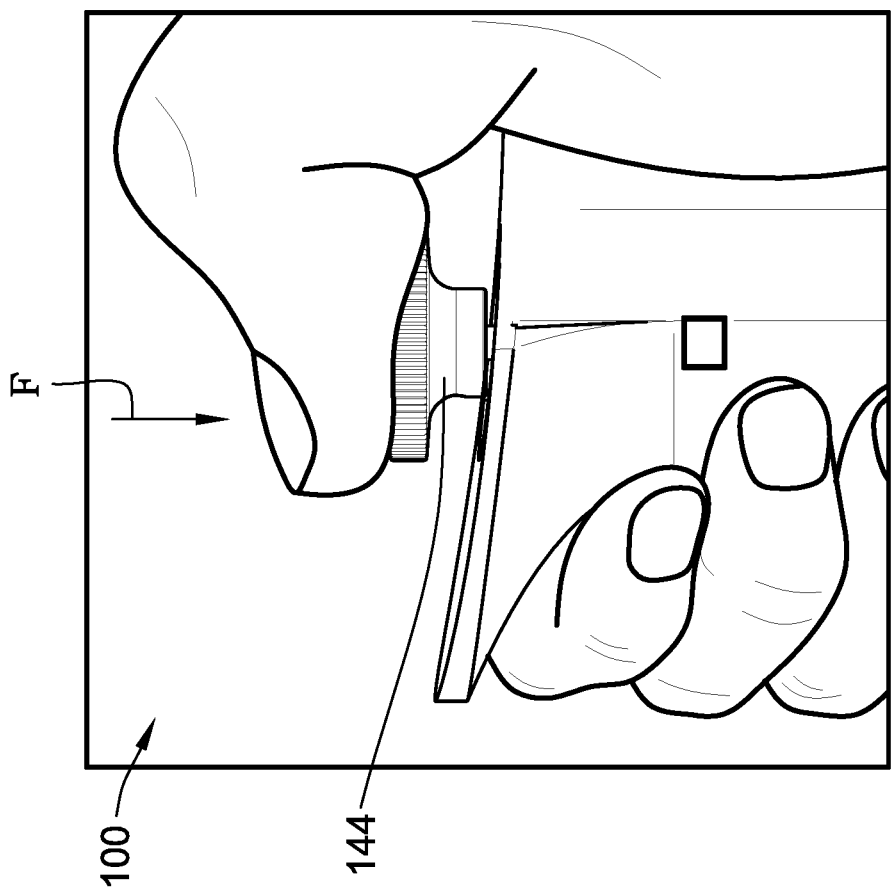
FIG. 10B is a partial perspective view of a user operating the pipetting device of FIG. 1 in the dispensing mode.
Figure 10A:
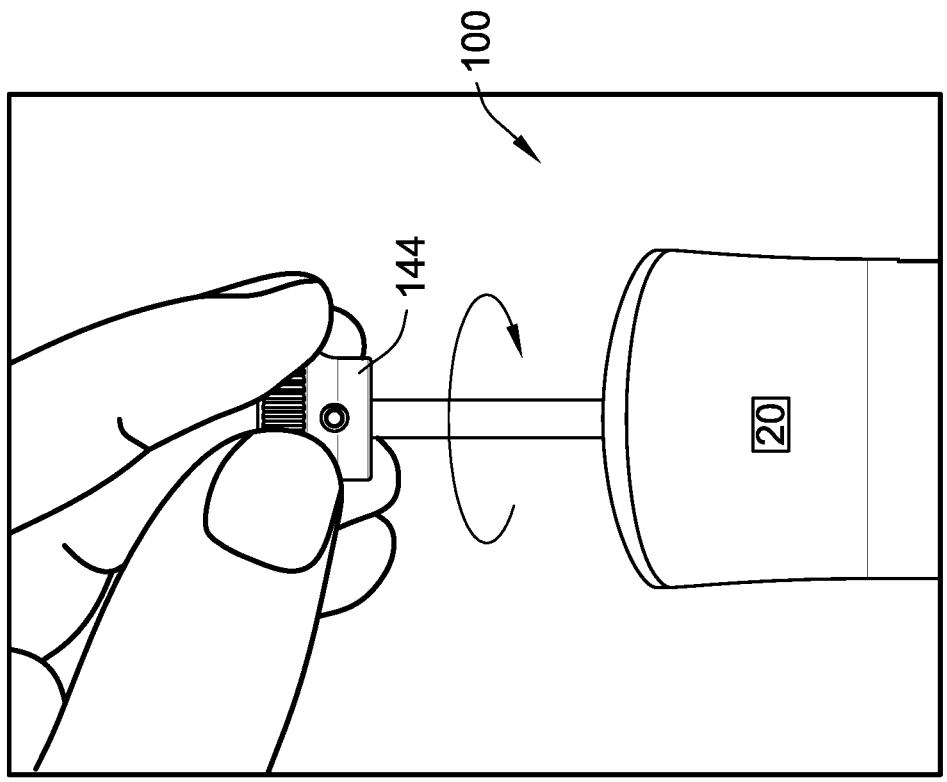
FIG. 10A is a partial perspective view a user transitioning the pipetting device of FIG. 1 to a dispensing mode.

Referring to FIG. 10A, the user then rotates the push button 144 counterclockwise to toggle the pipetting device 100 into the dispense mode. The user continues to rotate the push button 144 until the desired dispense volume is displayed in the volume display window 116. To dispense blood from the capillary tube 102, the user then presses the push button 144 as shown in FIG. 10B.

As described above, the indexing mechanism 190A permits a volume of fluid to be dispensed from the capillary tube 102 between 5 µL and 50 µL. For example, the user can rotate the push button 144 until a 5 µL marking is displayed through the volume display window 116. After dispensing 5

µL by pressing the push button 144 and then releasing the push button 144, the user can then rotate the push button 144 until, for example, the volume display window 116 displays a 25 µL marking. The user then can dispense 25 µL. In this manner, the user can repeatedly adjust the volume of blood that is dispensed from the capillary tube 102, even while the blood is stored in the capillary tube 102. Thus, for example, the user can collect 100 µL of blood when the pipetting device 100 is in the filling mode described above, toggle the pipetting device 100 to the dispensing mode, dispense 10 µL of blood by pressing the push button 144, rotate the push button 144 to adjust the dispense volume to 50 µL, and press the push button 144 to dispense 50 µL of blood.

Figure 11B:
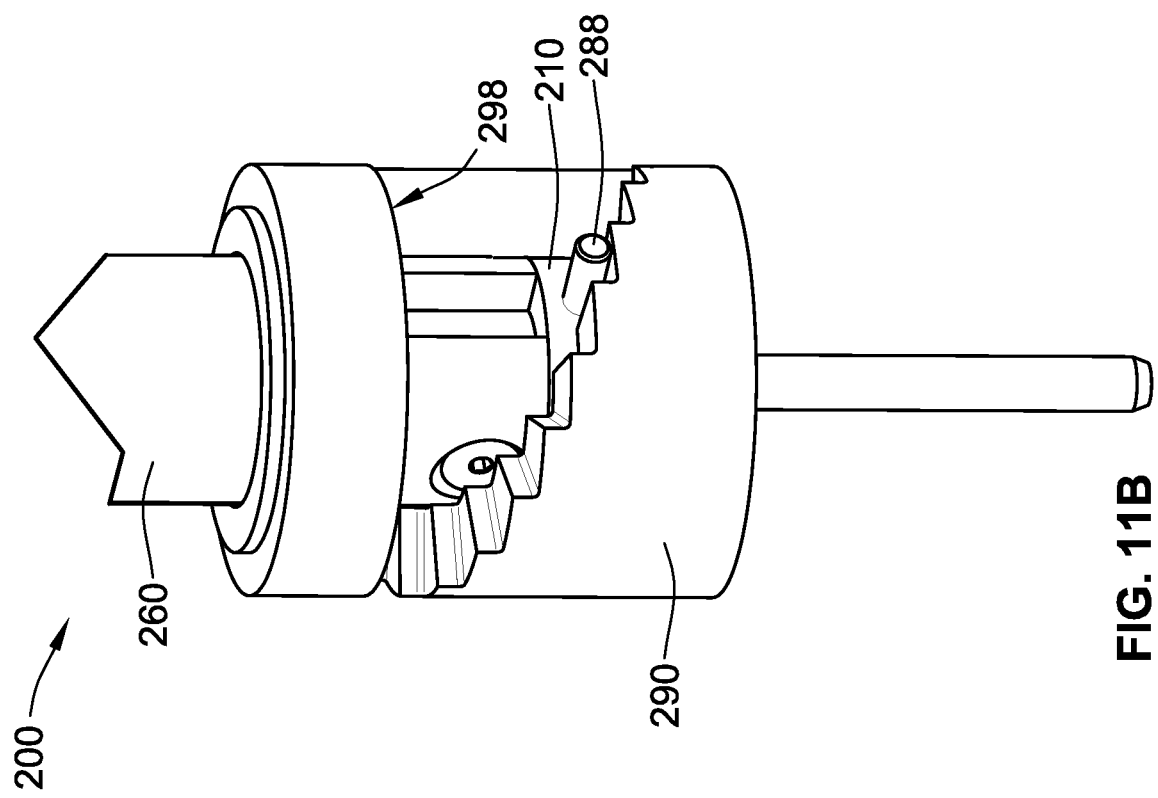
FIG. 11B is another enlarged perspective view of the pipetting device of FIG. 11A.
Figure 11A:
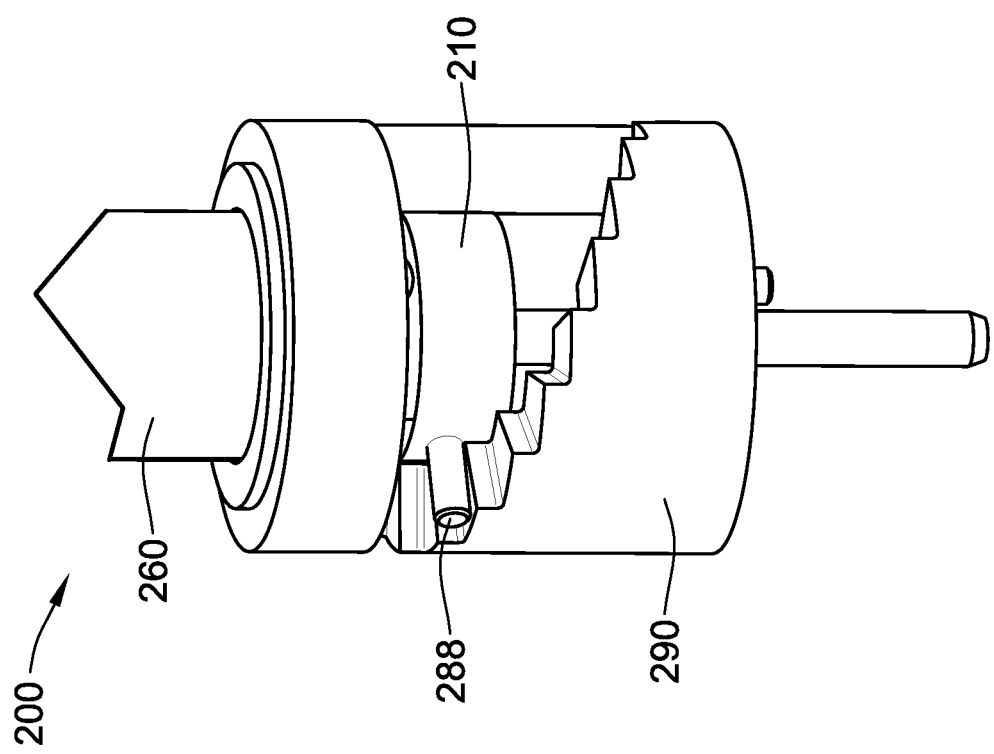
FIG. 11A is an enlarged perspective view of an indexing mechanism of a pipetting device according to some implementations of the present disclosure.

Referring to FIGS. 11A and 11B, a pipetting device 200 that is the same as or similar to the pipetting device 100 and includes volume adjusting mechanism 290 having a follower connector 210, a piston mount 260, and a cylindrical cam indexing mechanism 291. The piston mount 260 and the indexing mechanism 291 are the same as or similar to the piston mount 160 and the indexing mechanism 190A of the pipetting device 100. Unlike the follower 188 of the pipetting device 100, which is affixed directly to the piston mount 160, a follower 288 is coupled to the follower connector 210. The follower connector 210 has a generally cylindrical configuration and is partially disposed within the piston mount 260 such that the follower connector 210 is coupled to the piston mount 260. Like the follower 188 of the pipetting device 100, the follower 288 can rotate about an origin surface 298 of the indexing mechanism 291. Thus, the volume adjusting mechanism 290 functions in the same or similar manner as the volume adjusting mechanism 190 of the pipetting device 100.

Figure 12A:
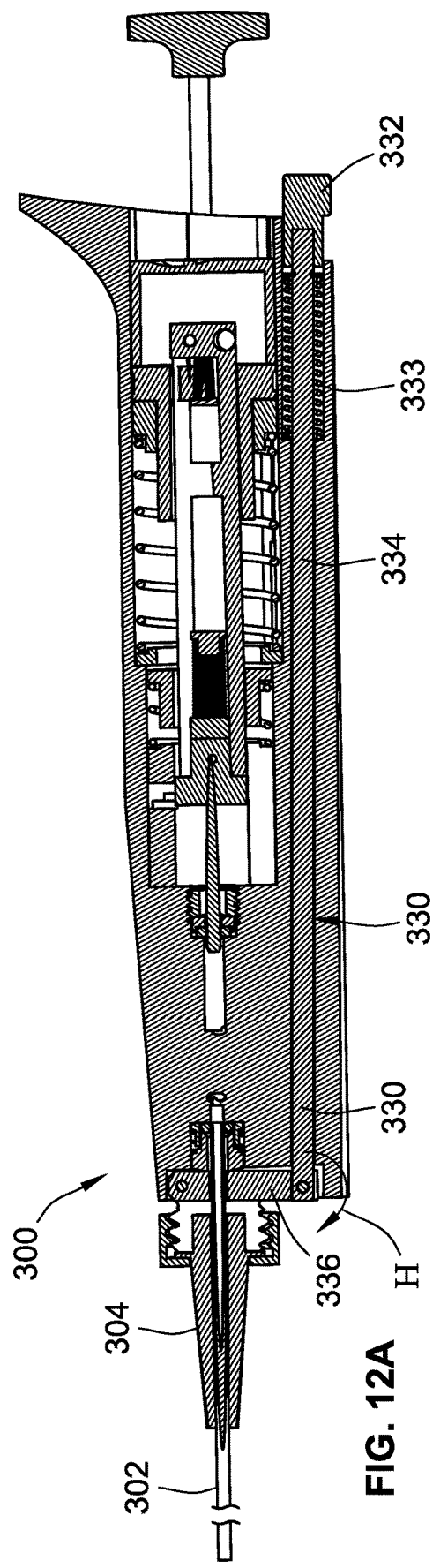
FIG. 12A is a cross-sectional side view of a pipetting device according to some implementations of the present disclosure.
Figure 12B:
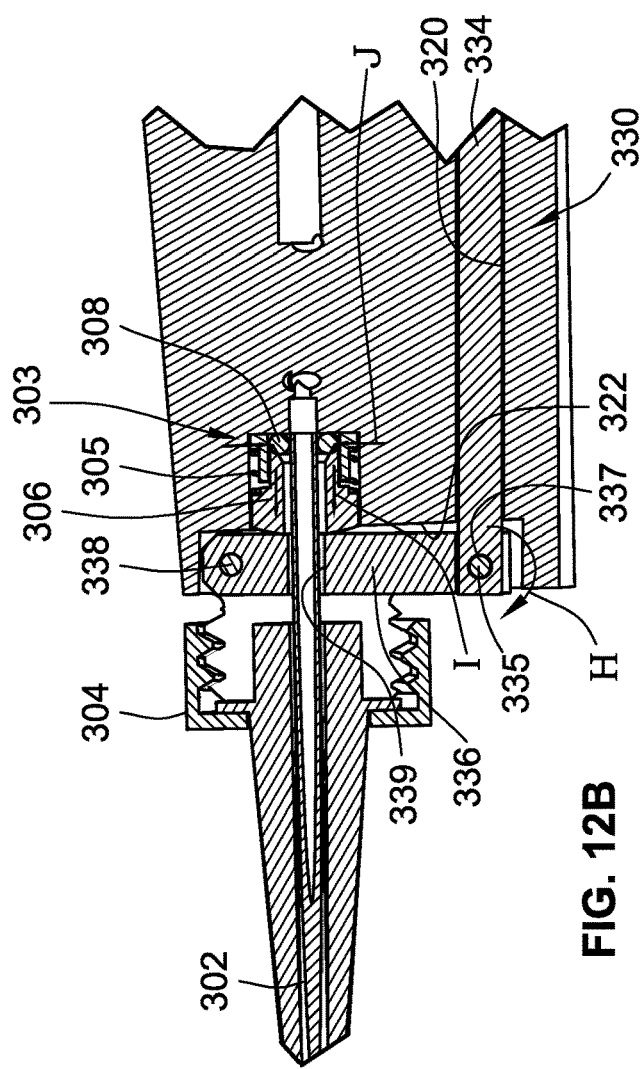
FIG. 12B is an enlarged partial cross-sectional view of the pipetting device of FIG. 12A.

Referring to FIGS. 12A and 12B, a pipetting device 300 that is the same as or similar to the pipetting device 100 includes a capillary tube 302 and a capillary sheath 304 that are the same as the capillary tube 102 and the capillary sheath 104 of the pipetting device 100. The pipetting device 300 also includes a housing 310 that is similar to the housing 110 of the pipetting device 100, but further includes a first ejector chamber 320, a second ejector chamber 322, and an ejector assembly 330.

The ejector assembly 330 includes an ejector button 332, an ejector rod 334, and a linkage 336. As shown, the ejector rod 334 has a generally cylindrical configuration and is disposed within the first ejector chamber 320. The ejector rod 334 has a first end that is coupled to the ejector button 332 and a second end that has a pin 335. The pin 335 has a generally cylindrical configuration and extends generally perpendicular to a central axis of the ejector rod 334. The ejector rod 334 can be made of, for example, a polymer material, a metal material, or the like, or any combination thereof.

The linkage 336 has a generally rectangular configuration and is disposed within the second ejector chamber 322. The linkage 336 includes a coupling aperture 337, a pivot point 338, and a generally central throughhole 339. The coupling aperture 337 receives the pin 335 of the ejector rod 334 such that the linkage 336 is coupled to the ejector rod 334. The coupling aperture 337 permits rotation of the pin 335 therein. The generally central throughhole 339 receives the capillary tube 302 therein.

As best shown in FIG. 12B, the housing 310 includes a capillary chamber 328 with a capillary seal 303 disposed therein that are the same as or similar to the capillary chamber 128 and capillary seal 103 of the pipetting device 100. The capillary seal 303 includes a spring 305, an actuation wedge 306, and an o-ring 308. The actuation wedge 306 compresses the o-ring 308 to aid the o-ring 308 in securing the capillary tube 302 within the capillary seal 303.

Referring to FIG. 12A, as a user pushes the ejector button 332 in the direction of arrow G, the ejector rod 334 moves and/or slides within the first ejector chamber 320 towards the linkage 336. A spring 333 resists movement of the ejector button 332 in the direction of arrow G and generally urges the ejector button 332 to move in the opposite direction of arrow G. As best shown in FIG. 12B, movement of the ejector rod 334 towards the linkage 336 to move above the pivot point 338 along arrow H. Movement of the linkage 336 about its pivot point causes the spring 305 to be partially released, allowing the actuation wedge 306 to move down in the direction of arrow I. As the actuation wedge 306 moves along arrow I, compression on the o-ring 308 is relieved, as shown by arrow J in FIG. 12B. Thus, when the pipetting device 300 is held upright, gravity causes the capillary tube 302 to fall out of the capillary seal 303 and out of the pipetting device 300. Releasing the ejector button 332 causes the linkage 336 to pivot about its pivot point 338 in the opposite direction of arrow H, causing the o-ring 308 to be compressed as described above. Advantageously, this configuration allows a user to remove the capillary tube 302 from the pipetting device 300 and dispose of it without needing to touch the capillary tube 302, which can be a biohazard and pose a risk to the user.

Figure 13C:
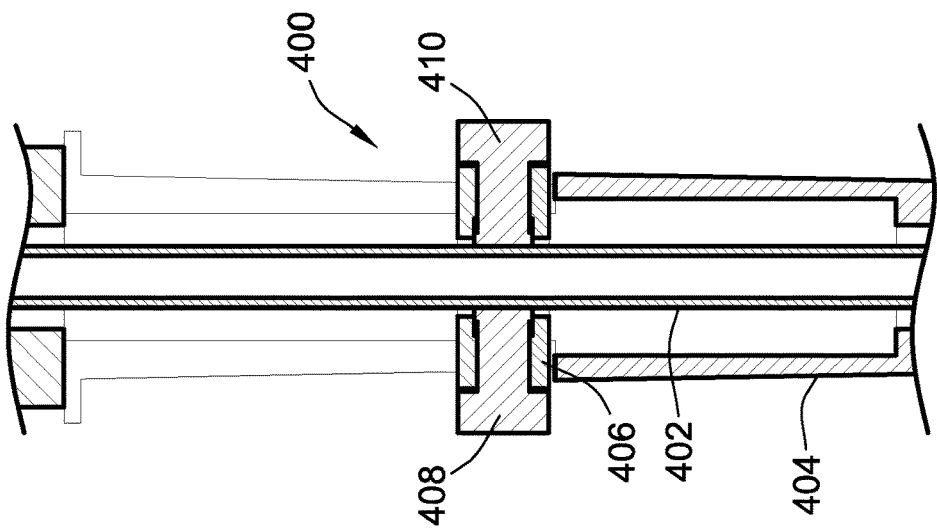
FIG. 13C is another cross-sectional side view of the capillary sheath and capillary tube of the pipetting device of FIG. 13A.
Figure 13B:
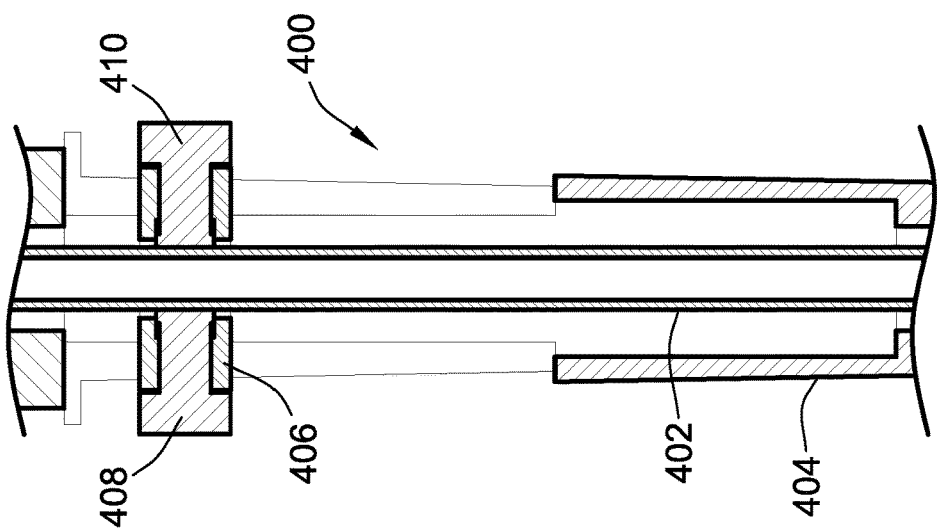
FIG. 13B is another cross-sectional side view of the capillary sheath and capillary tube of the pipetting device of FIG. 13A.
Figure 13A:
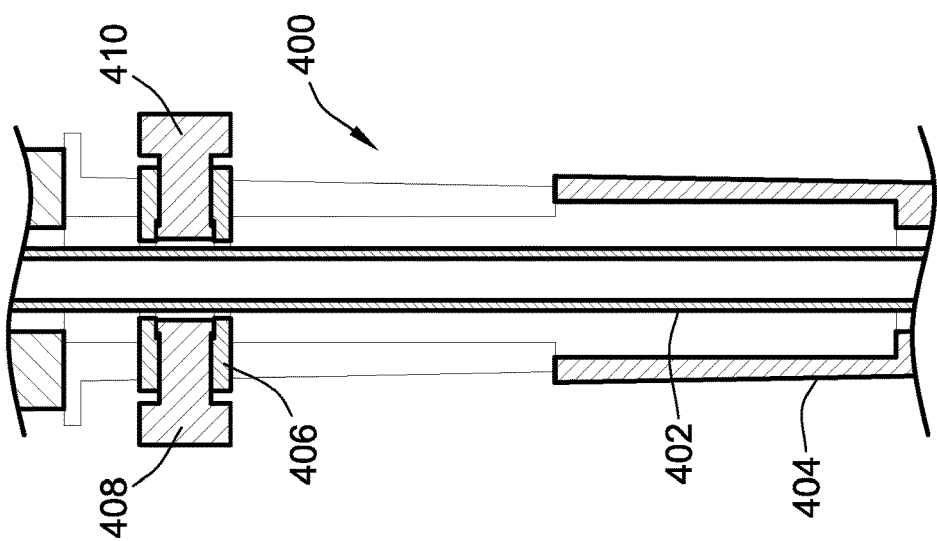
FIG. 13A is a cross-sectional side view of a capillary sheath and capillary tube of a pipetting device according to some implementations of the present disclosure.

Referring to FIGS. 13A-13C, a pipetting device 400 that is similar to the pipetting device 100 includes a capillary tube 402 that is the same as or similar to the capillary tube 102 of the pipetting device 100 and a capillary sheath 404 that is similar to the capillary sheath 104 of the pipetting device 100. Unlike the capillary sheath 104, the capillary sheath 404 includes a locking collar 406, a first locking tab 408, and a second locking tab 410. The locking collar 406 and first and second locking tabs 408, 410 allow the capillary tube 402 to be secured within the capillary sheath 404. The locking collar 406 and locking tabs 408, 410 are shown in an open position in FIG. 13A. In this configuration, the capillary tube 402 can be inserted into, or removed from, the capillary sheath 404. To secure the capillary tube 402 within the capillary sheath 404, a user depresses the locking tabs 408, 410 such that they contact the capillary tube 402, as shown in FIG. 13B. The user then moves or slides the locking collar 406 along the tapered surface of the capillary sheath until it reaches a closed position, as shown in FIG. 13C. In the closed position, the position of the locking collar 406 increases the compression of the capillary tube 402 by the locking tabs 408, 410, thereby aiding in securing the capillary tube 402 within the capillary sheath 404.

Figure 14A:
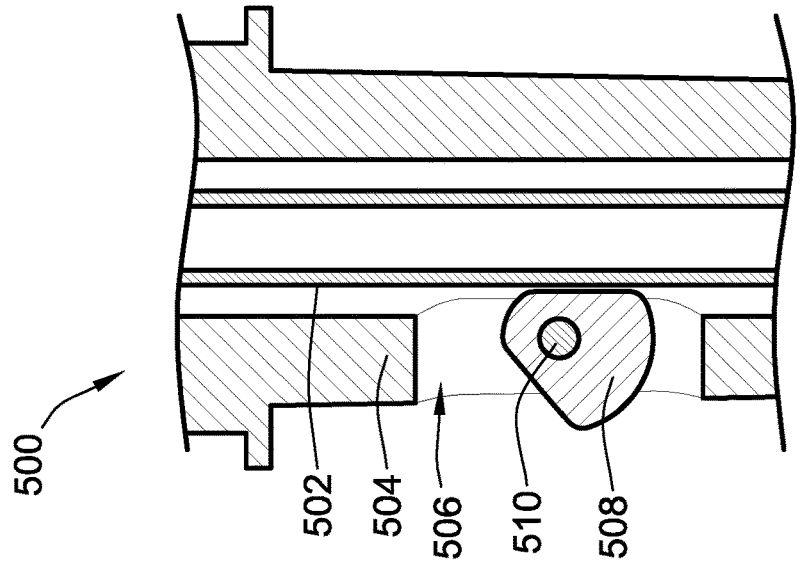
FIG. 14A is a cross-sectional side view of a capillary sheath and capillary tube of a pipetting device according to some implementations of the present disclosure.
Figure 14B:
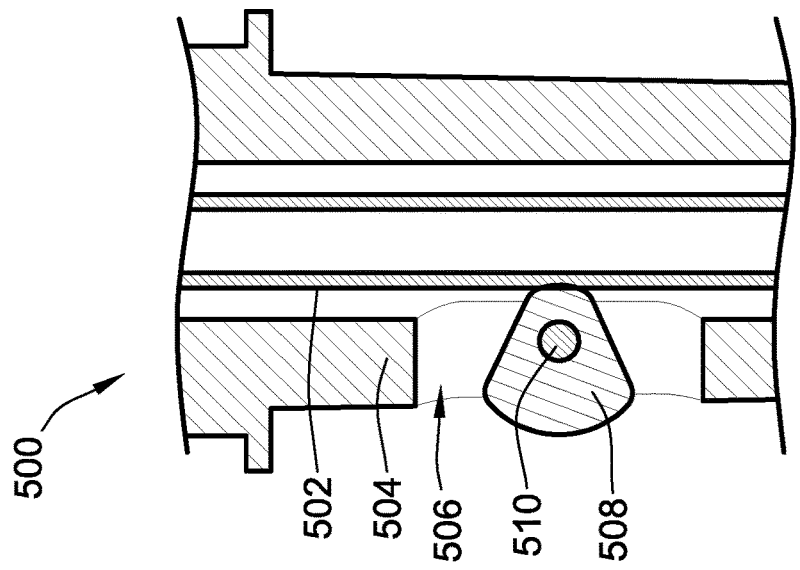
FIG. 14B is another cross-sectional side view of the capillary sheath and capillary tube of the pipetting device of FIG. 14A.
Figure 14C:
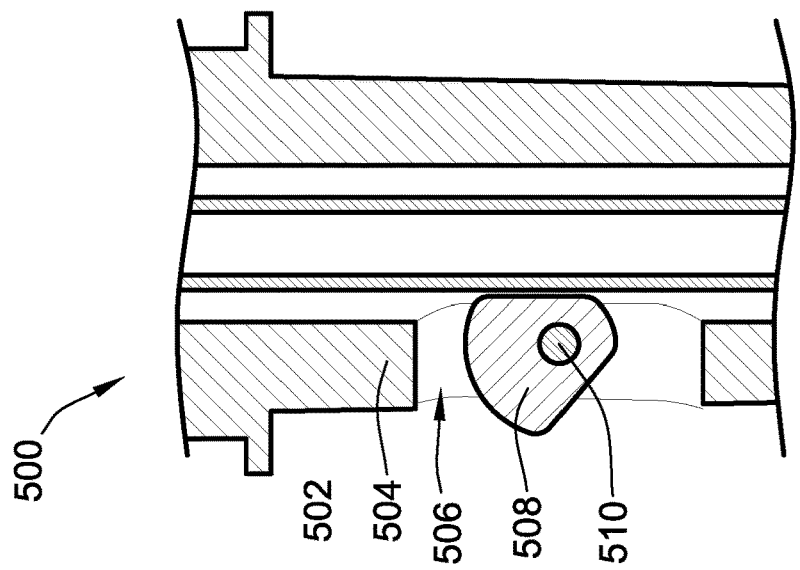
FIG. 14C is another cross-sectional side view of the capillary sheath and capillary tube of the pipetting device of FIG. 14A.
Figure 15C:
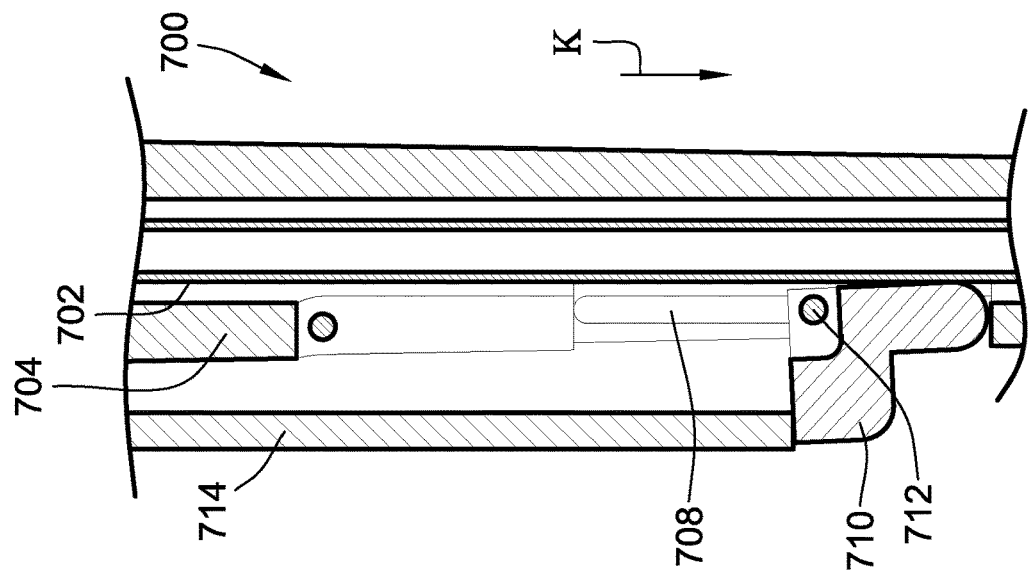
FIG. 15C is another cross-sectional side view of the capillary sheath and capillary tube of the pipetting device of FIG. 15A.

Referring to FIGS. 14A-14C, a pipetting device 500 that is similar to the pipetting device 100 includes a capillary tube 502 that is the same as or similar to the capillary tube 102 of the pipetting device 100 and a capillary sheath 504 that is similar to the capillary sheath 104 of the pipetting device 100. The capillary sheath 504 differs from the capillary sheath 104 in that it includes a cutout 506 and a wedge 508. The wedge 508 includes a pivot point 510 which allows the wedge 508 to rotate within the cutout 506 about the pivot point 510. The wedge 508 aids in securing the capillary tube 502 within the capillary sheath 504 depending on its angular position as it rotates about the pivot point 510. FIG. 14A shows the wedge 508 in an open position where the wedge does not contact the capillary tube 502, thereby allowing the capillary tube 502 to move within the capillary sheath 504. FIG. 15C also shows the wedge 508 in an open position. To secure the capillary tube 502 within the capillary sheath 504, a user grasps the wedge 508 through the cutout 506 and rotates it about the pivot point 510 until it reaches a closed position, as shown in FIG. 14B. In the closed position, the wedge 508 contacts the capillary tube 502 and compresses the capillary tube 502 between itself and a wall of the capillary sheath 504, thereby securing the capillary tube 502 within the capillary sheath 504.

Figure 15B:
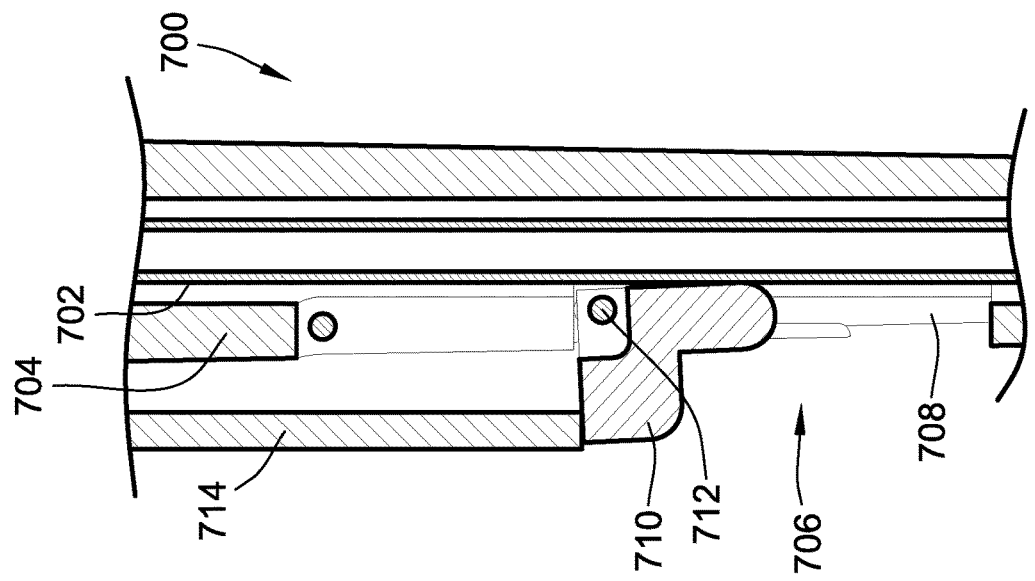
FIG. 15B is another cross-sectional side view of the capillary sheath and capillary tube of the pipetting device of FIG. 15A.
Figure 15A:
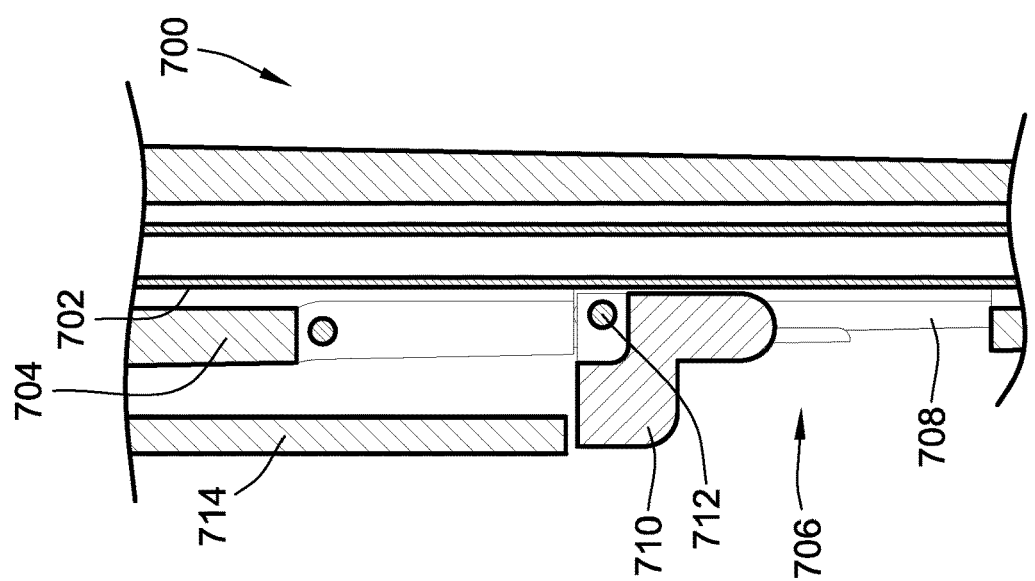
FIG. 15A is a cross-sectional side view of a capillary sheath and capillary tube of a pipetting device according to some implementations of the present disclosure.

Referring to FIGS. 15A-15C, a pipetting device 700 that is similar to the pipetting device 100 includes a capillary tube 702 that is the same as or similar to the capillary tube 102 of the pipetting device 100 and a capillary sheath 704 that is similar to the capillary sheath 104 of the pipetting device 100. The capillary sheath 704 differs from the capillary sheath 104 in that it includes a cutout 706, a locking tab 710, and a locking arm 714. The cutout 706 includes a slot 708 that receives a pivot point 712 of the locking tab 710, allowing the pivot point 712 to slide and/or rotate within the slot 708. The locking tab 710 has a generally L-shaped configuration and can move within the cutout 706 along the slot 708 and/or rotate within the cutout 706 about the pivot point 712. The locking tab 710 generally aids in securing the capillary tube 702 within the capillary sheath 704. When the locking tab 710 is an open position, as shown in FIG. 15A, the locking tab 710 allows the capillary tube 702 to move freely in and out of the capillary sheath 704. To secure the capillary tube 702 within the capillary sheath 704, a user moves the locking arm 714 in the direction of arrow K, causing the locking tab 710 to rotate about its pivot point 712 and contact the capillary tube 702, as shown in FIG. 15B. As the user continues to move the locking arm 714 in the direction of arrow K until the locking tab 710 also moves in the direction of arrow K along the slot 708 of the cutout 706 until the locking tab 710 reaches a closed position, as shown in FIG. 15C. The tapered configuration of the capillary sheath 704 causes the locking tab 710 to further compress the capillary tube 702 between the locking tab 710 and a wall of the capillary sheath 704, thereby securing the capillary tube 702 within the capillary sheath 704.

Referring to FIGS. 16A-16F, a pipetting device 800 that is similar to the pipetting device 100 includes a capillary tube 802 that is the same as or similar to the capillary tube 102 of the pipetting device 100 and a capillary sheath 804 that is the same as or similar to the capillary sheath 104 of the pipetting device 100. The pipetting device 800 also includes a housing 810 that is similar to the housing 110 of the pipetting device 100 and an o-ring 814 for securing the capillary tube 802 in place within the housing 810. The pipetting device 800 differs from the pipetting device 100 in that it includes an ejector arm 820, a chuck 830, a first clamping element 840, a second clamping element 850, a base 860, and a spring 870. Further, the housing 810 differs from the housing 110 of the pipetting device 100 in that the housing 810 includes a plurality of ridges 812 protruding from an inner surface of the housing 810 (FIG. 16A) that can engage ridges on the first clamping element 840 and/or the second clamping element 850.

As shown, the ejector arm 820 includes a rod portion 822, a middle portion 824, and a cap portion 826. The rod portion 822, middle portion 824, and cap portion 826 are unitary and/or monolithic and can be made of a polymer material, a metal material, or any other suitable material, or any combination thereof. Alternatively, the rod portion 822, middle portion 824, and cap portion 826 can separate components coupled to one another. As shown, the cap portion 826 is disposed within the housing 810, the rod portion 822 is positioned outside of the housing 810, and the middle portion extends through a slot in the housing 810. Thus, movement of the rod portion 822 outside of the housing 810 causes movement of the cap portion 826 inside the housing 810. The cap portion 826 has a generally cylindrical configuration and includes a generally central aperture 828 (FIG. 16B) that receives the capillary tube 802 therein.

Referring to FIGS. 16B and 16C, the chuck 830 is disposed within the housing 810 and includes a plurality of jaws 832 and a plurality of springs 834. As best shown in FIG. 16C, the plurality of springs 834 are positioned between each of the plurality of jaws 832 such that the plurality of springs 834 urges the plurality of jaws 832 to move away from one another and avoid contact the capillary tube 802, which extends through the chuck 830, enabling the capillary tube 802 to be inserted or removed. While the plurality of jaws 832 is shown as having 3 jaws, any number of jaws can be used, such as, 2 jaws, 6 jaws, 8 jaws, 12 jaws, etc. Likewise, the plurality of springs 834 is shown as having 3 springs, however, any number of springs can be used with any number of jaws, such as, 3 jaws and 6 springs, 4 jaws and 4 springs, 5 jaws and 10 springs, etc. The spring constants of each of the plurality of springs 834 can be varied to provide a desired amount of resistance.

The first clamping element 840 is disposed within the housing 810 and has a generally cylindrical configuration. The first clamping element 840 includes a top tapered surface 842 (FIG. 16B), a first generally central aperture 844 (FIG. 16B), a second generally central aperture 846 (FIG. 16B), and a plurality of teeth 848 (FIG. 16A). As shown in FIG. 16B, the top tapered surface 842 is configured to engage the plurality of jaws 832 of the chuck 830 and the first generally central aperture 844 receives the capillary tube 802 therein such that the capillary tube 802 extends through the first clamping element 840. The second generally central aperture 846 receives a top portion 854 of the second clamping element 850 therein. As shown in FIG. 16A, the plurality of teeth 848 are formed on bottom surface of the first clamping element 840.

Referring to FIG. 16B, the second clamping element 850 is also disposed within the housing 810 and has a generally cylindrical configuration. The second clamping element 850 includes a generally central aperture 852 (FIG. 16B), top portion 854 (FIG. 16B), and a plurality of teeth 858 (FIG. A). The generally central aperture 852 of the second clamping element 850 receives the capillary tube 802 therein such that the capillary tube 802 extends through the second clamping element 850. As shown in FIG. 16A, the plurality of teeth 858 are formed on a top surface of the second clamping element 850 and are similar to the plurality of teeth 848 of the first clamping element 840. Each of the plurality of teeth 848 of the first clamping element 840 are sized and shaped to engage a corresponding one of the plurality of teeth 858 of the second clamping element 850.

The base 860 is also disposed within the housing 810 and includes a generally central aperture 862 for receiving the capillary tube 802 therein (FIG. 16B). As shown, the spring 870 is positioned between the base 860 and the capillary sheath 804 such that the spring 870 urges the base 860, the second clamping element 850, the first clamping element 840, the chuck 830, and the ejector arm 820 in the opposite direction of arrow L (FIG. 16A).

To eject the capillary tube 802 from the pipetting device 800, a user moves the ejector arm 820 in the direction of arrow L. Movement of ejector arm 820 in the direction of arrow L causes the cap portion 826 to move the chuck 830 in the direction of arrow L as well. As the chuck 830 moves towards the first clamping element 840, the top tapered surface 842 (FIG. 16B) of the first clamping element 840 compresses the plurality of jaws 832 and the plurality of springs 834 (FIG. 16C) such that the chuck 830 engages the capillary tube 802 via the plurality of jaws 832. The spring 870 prevents the first clamping element 840, the second clamping element 850, and the base 860 from moving while the chuck 830 is initially compressed to engage the capillary tube 802.

Referring to FIG. 16D, with the chuck 830 engaging the capillary tube 802, the user then continues to move the ejector arm 820 in the direction of arrow L, which causes the capillary tube 802 to be released from the o-ring 814 (FIG. 16B). With the capillary tube 802 released from the o-ring 814, and as the ejector arm 820 continues to move in the direction of arrow L, the first clamping element 840 and the second clamping element 850 also move in the direction of arrow L and are guided by the plurality of ridges 812 (FIG. 16A) of the housing 810. During this process, the spring 870 compresses to allow movement of the first clamping element 840 and the second clamping element 850 in the direction of arrow L.

Referring to FIG. 16E, the second clamping element 850 reaches the end of the plurality of ridges 812 of the housing 810. The geometry of the second clamping element 850 and the force caused by the spring 870 rotates and drives up the second clamping element 850 until the plurality of teeth 858 of the second clamping element 850 engage the plurality of teeth 848 of the first clamping element 840, as shown in FIG. 16F. As the second clamping element 850 rotates, the resulting force caused by compression of the spring 870 is transferred to the housing 810, permitting the plurality of springs 834 of the chuck 830 to decompress and forcing the plurality of jaws 832 to move away from one another. The chuck 830 then releases the capillary tube 802 and gravity causes the capillary tube 802 to fall out of the pipetting device 800. The user then releases the ejector arm 820 and the spring 870 returns the components to their original positions shown in FIG. 16A. Advantageously, this configuration allows a user to remove the capillary tube 802 from the pipetting device 800 and dispose of it without needing to touch the capillary tube 802, which can be a biohazard and pose a risk to the user.

Figure 17C:
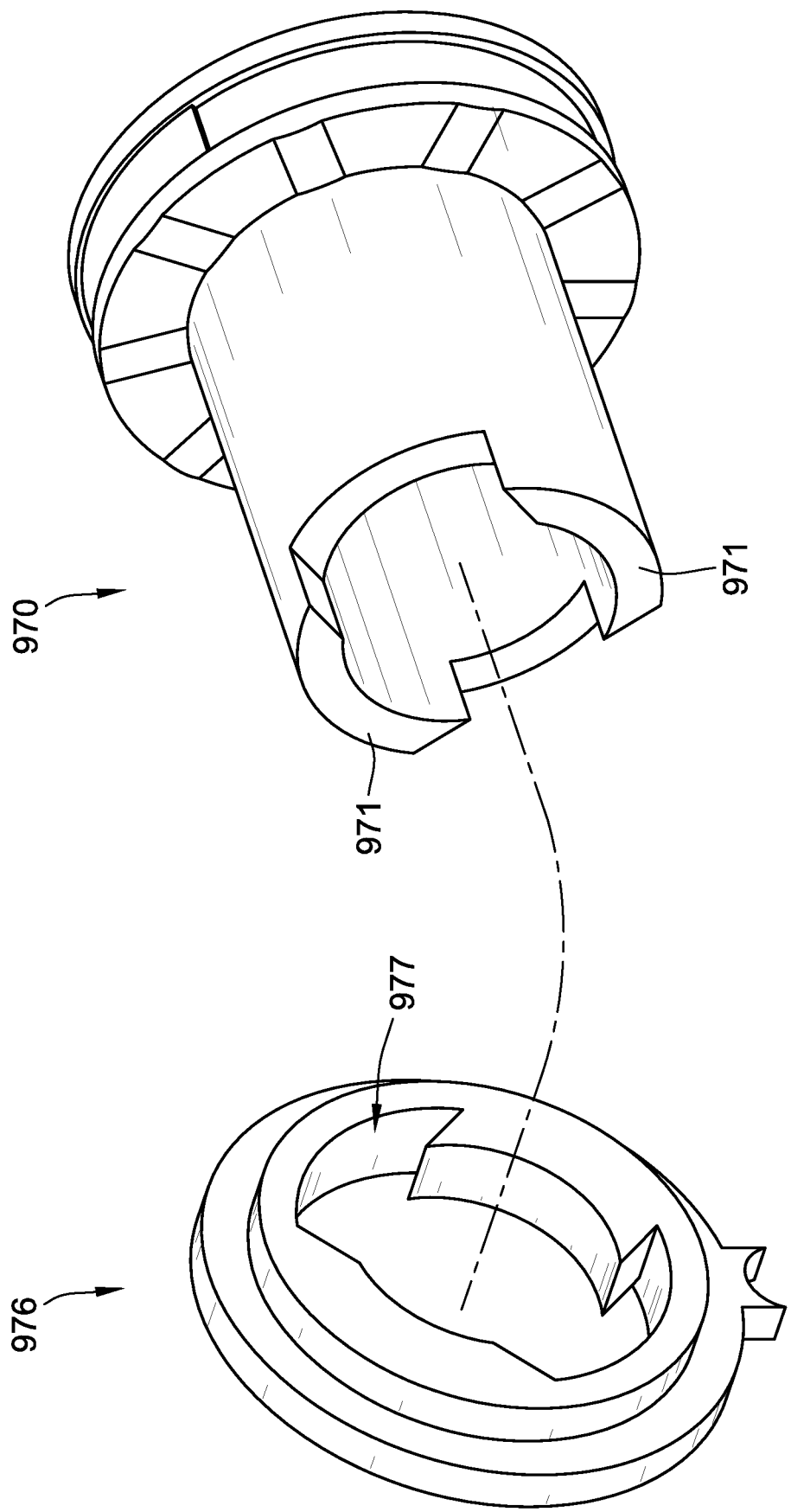
FIG. 17C is a perspective view of a trigger base and a push rod connector of the pipetting device of FIG. 17A.

Referring generally to FIGS. 17A-17C, a pipetting device 900 that is the same as or similar to the pipetting device 100 (FIG. 2) described above is shown. The pipetting device 900 differs from the pipetting device 100 in that the pipetting device 900 does not include the optional soft stop 180 (FIG. 2). The pipetting device 900 includes a trigger base 976 that is similar to the trigger base 176 (FIG. 2) and a push rod connector 970 that is similar to the push rod connector 170 (FIG. 2). As best shown in FIG. 17C, the trigger base 976 differs from the trigger base 176 (FIG. 2) in that the trigger base 176 includes a keyway 977, and the push rod connector 970 differs from the push rod connector 170 (FIG. 2) in that the push rod connector 970 includes a key 971 protruding outwardly from a lower surface thereof. Generally, the keyway 977 (FIG. 17C) is sized and shaped to receive the key 971 therein when the push rod connector 970 is rotated via the push button 144 (FIG. 2) such that the key 971 is positioned directly above the keyway 977 and the push rod connector 970 is moved towards the trigger base 976 (FIG. 17B). When the key 971 is not positioned directly above the keyway 977, the key 971 contacts the upper surface of the trigger base 976 to inhibit further movement of the push rod connector 970 in the direction of arrow A (FIG. 17A).

Operation of the pipetting device 900 differs from operation of the pipetting device 100 as follows. Like the pipetting device 100, to commence a filling operation, a user depresses the push button 144 (FIG. 2) from position 630 to position 640 described above (FIG. 6) to move the shuttle valve into the filling position (FIG. 4B). However, operation of pipetting device 900 differs from the pipetting device 100 in that prior to depressing the push button 144, the user rotates the push button 144 (shown in FIG. 8A as being clockwise, but could be counterclockwise in other implementations) until the filing indicator 173a (FIG. 8A) is visible through the volume display window 116. As described above, rotation of the push button 144 causes a corresponding rotation of the push rod connector 970. When the filling indicator is visible, the push rod connector 970 is positioned such that the key 971 is positioned directly above the keyway 977 of the trigger base 976. As described above, when the push button 144 is depressed, the valve trigger 174 engages the first notch 133a of the valve rod 132, moving the valve assembly 130 in the direction of arrow A towards the filling position (FIG. 4B). As shown in FIG. 17B, when the push rod connector 970 reaches the trigger base 976, the key 971 protrudes into the keyway 977 of the trigger base 976, allowing the valve trigger 174 to continue to move the valve assembly 130 in the direction of arrow A until the shuttle valve 134 reaches the filling position (FIG. 4B).

When the push button 144 is rotated to any one of a plurality of dispensing positions prior to being depressed, the key 971 is not positioned directly above the keyway 977 of the trigger base 976. In this configuration, as the push button 144 is depressed, the valve trigger 174 engages the first notch 133a of the valve rod 132, moving the valve assembly 130 in the direction of arrow A. As shown in FIG. 17A, eventually, the key 971 of the push rod connector 970 contacts an upper surface of the trigger base 976, inhibiting further movement of the push rod connector 970, valve trigger 174, and the push button 144 in the direction of arrow A. In this position, the shuttle valve 134 of the valve assembly 130 is in the dispensing position (FIG. 4C) and the key 971 does not interfere with the operation of the pipetting device 900. The key 971 also does not interfere with the operation of the pipetting device 900 when the shuttle valve 134 of the valve assembly is in the chamber priming position (FIG. 4A).

Advantageously, unlike the pipetting device 100 shown in FIG. 2, the optional soft stop is not needed to provide haptic feedback to the user to indicate the initiation of a filling operation. Instead, in the pipetting device 900, the user simply rotates the push button 144 until the filling indicator is shown and then depresses the push button 144 all the way down to initiate filling of the capillary tube 102 until a desired volume of fluid is drawn into the capillary tube 102.

Although the pipetting devices 100, 200, 300, 400, 500, 700, 800, 900 of the present disclosure are shown and described as being used to collect and/or dispense fingerstick blood, the same, or similar, pipetting devices can be used to perform any procedure normally performed with a pipette, and to collect and dispense any fluid, such as, for example, water, bodily fluids, (e.g., pre-drawn venous blood, lymph, bronchial lavage, urine, sweat, spinal fluid, pleural fluid, peritoneal fluid, mucus, tears) chemicals, pharmaceuticals, or the like, or any combination thereof.

While the present invention has been described with reference to one or more particular embodiments, those skilled in the art will recognize that many changes may be made thereto without departing from the spirit and scope of the present invention. Each of these embodiments and obvious variations thereof fall within the spirit and scope of the invention. Additional embodiments according to aspects of the present invention can combine any number of features from any of the embodiments described herein.

The invention claimed is:

1. A pipetting device comprising:
a housing including a tip for receiving a capillary tube;
a valve assembly having a shuttle valve and a valve rod, the shuttle valve having a filling position and a dispensing position;
an actuator assembly having an actuator, a valve trigger, a piston mount, and an indexing mechanism;
the actuator extending from the housing and including a push button coupled to a push rod;
the valve trigger being configured to engage the valve assembly responsive to movement of the push button and including an aperture configured to receive the piston mount therein; and
the indexing mechanism including a follower and a cylindrical cam having an origin surface and a plurality of spiral steps, the indexing mechanism being configured such that rotation of the push button causes the follower to rotate relative to the origin surface and engage one of the plurality of the plurality of spiral steps to index a rotated position of the push button to a predefined volume of dispensed fluid.

2. The pipetting device of claim 1, wherein the valve trigger is configured to move the shuttle valve to the filling position and allow a fluid to be drawn into the capillary tube responsive to movement of the push button towards the housing.

3. The pipetting device of claim 2, wherein the valve trigger is configured to move the shuttle valve to a chamber priming position and aid in preventing fluid from being drawn into the capillary tube responsive to movement of the push button away from the housing.

4. The pipetting device of claim 1, wherein responsive to a fluid being drawn into the capillary tube and moving the push button towards the housing, the valve trigger moves the shuttle valve to the dispensing position and the piston causes a predefined volume of the fluid to be dispensed from the capillary tube that is proportional to the distance that the piston travels within the pipetting device when the push button is moved towards the housing.

5. The pipetting device of claim 1 wherein the predefined volume of dispensed fluid is between about 5 µL and about 50 µL.

6. The pipetting device of claim 5, wherein the plurality of steps of the cutout of the indexing mechanism includes eleven steps such that each rotated position of the push button corresponds to a 5 µL incremental change in predefined volume of dispensed fluid.

7. The pipetting device of claim 1, wherein the actuator assembly further comprises a first spring positioned between the valve trigger and the indexing mechanism such that the spring resists movement of the push button towards the housing.

8. The pipetting device of claim 7, wherein the actuator assembly further comprises a soft stop and a second spring, the second spring being positioned between the indexing mechanism and the soft stop and the first spring being positioned between the soft stop and the valve trigger, such that the first spring, the soft stop, and the second spring resist movement of the push button towards the housing.

9. The pipetting device of claim 1, wherein the valve rod includes a first notch and a second notch each configured to engage the valve trigger, wherein movement of the push button towards the housing causes the valve trigger to engage the first notch, and wherein movement of the push button away from the housing causes the valve trigger to engage the second notch.

10. The pipetting device of claim 1, wherein the actuator assembly further comprises a protective cap including an aperture configured to receive the push rod, wherein the protective cap seals valve trigger, piston mount, and indexing mechanism within the housing.

11. The pipetting device of claim 1, wherein the piston mount includes a first aperture having a slider coupled to the push rod and a piston spring disposed therein and a second aperture having a piston disposed therein.

12. The pipetting device of claim 1, wherein the housing further comprises at least one of an open capillary indicator, a volume display, a capillary tube ejector, or any combination thereof.

13. The pipetting device of claim 1, wherein the capillary tube is a standard capillary tube having an outer diameter of at least approximately 1.75 mm with a maximum volume of at least 100 µL.

14. The pipetting device of claim 1, wherein the tip of the housing is further configured to receive a capillary sheath.

15. A method for using a pipetting device, comprising the steps of:
providing a housing including a tip coupled to a capillary tube;
providing a valve assembly including a shuttle valve and a valve rod;
providing an actuator assembly including an actuator, a valve trigger, a piston mount, and an indexing mechanism;
the actuator including a push rod and a push button extending from the housing, the push rod being coupled to the push button;
the indexing mechanism including a follower and a cylindrical cam having an origin surface and a plurality of spiral steps;
rotating the push button such that the follower engages one of the plurality of spiral steps of the cylindrical cam;
pressing the push button towards the housing such that the shuttle valve moves to a filling position; and
placing the capillary tube in a volume of fluid, wherein the shuttle valve causes the volume of fluid to be drawn into the capillary tube.

16. The method of claim 15, further comprising, releasing the push button such that it moves away from the housing; rotating the push button such that the follower is positioned over one of the plurality of steps of the indexing mechanism corresponding to a first dispensing volume; and pressing the push button such that the shuttle valve moves to a dispensing position and wherein the indexing mechanism causes a first predefined volume of the fluid to be dispensed from the capillary tube.

17. The method of claim 16, further comprising, releasing the push button such that it moves away from the housing; rotating the push button such that the follower is positioned over one of the plurality of steps of the indexing mechanism corresponding to a second dispensing volume; and pressing the push button such that the shuttle valve moves to a dispensing position and wherein the indexing mechanism causes a second predefined volume of the fluid to be dispensed from the capillary tube, and where the second predefined volume is different than the first predefined volume.

18. The method of claim 15, wherein the tip of the housing is coupled to a capillary sheath, the capillary sheath having an aperture configured to receive the capillary tube therein.

19. The method of claim 15, further comprising, pressing a capillary tube ejector button of the housing such that the capillary tube is ejected from the pipetting device.

* * * * *